United States Patent [19]

Kojima et al.

[11] Patent Number: 5,604,910
[45] Date of Patent: Feb. 18, 1997

[54] METHOD OF AND VECTOR PROCESSOR FOR SEARCHING TEXT FOR KEY WORDS BASED ON CANDIDATE CHARACTER STRINGS OBTAINED FROM THE TEXT USING PARALLEL PROCESSING

[75] Inventors: Keiji Kojima, Kodaira; Yusuke Mishina, Kunitachi, both of Japan

[73] Assignee: Hitachi, Ltd., Tokyo, Japan

[21] Appl. No.: 499,424

[22] PCT Filed: Oct. 17, 1989

[86] PCT No.: PCT/JP89/01064

§ 371 Date: Jun. 18, 1990

§ 102(e) Date: Jun. 18, 1990

[87] PCT Pub. No.: WO90/04826

PCT Pub. Date: Mar. 5, 1990

[30] Foreign Application Priority Data

Oct. 18, 1988 [JP] Japan .................................. 63-260616

[51] Int. Cl.[6] ........................................................ G06F 7/00
[52] U.S. Cl. ................. 395/800; 364/231.9; 364/232.21; 364/237.6; 364/DIG. 1; 395/793
[58] Field of Search ..................................... 395/600, 775, 395/800; 364/715.9, 715.1, 715.11, 419.8, 419.13, 419.19; 340/146.2

[56] References Cited

U.S. PATENT DOCUMENTS

| 4,094,001 | 6/1978 | Miller | 395/775 |
|---|---|---|---|
| 4,423,206 | 2/1988 | Kojima et al. | 395/800 |
| 4,750,122 | 6/1988 | Kaji et al. | 364/419 |
| 4,955,056 | 9/1990 | Stentiford | 381/43 |
| 4,972,349 | 11/1990 | Kleinberges | 395/144 |
| 4,985,863 | 1/1991 | Fujisawa et al. | 395/600 |
| 5,014,327 | 5/1991 | Potter et al. | 382/14 |
| 5,051,947 | 9/1991 | Messenger et al. | 395/800 |
| 5,060,143 | 10/1991 | Lee | 395/600 |
| 5,146,539 | 9/1992 | Doddington et al. | 395/2 |

FOREIGN PATENT DOCUMENTS 62-210538  9/1987  Japan .
62-241026  10/1987  Japan .

OTHER PUBLICATIONS

Efficient String Matching: An aid to bibliographic Search pp. 333–340, date: 1975.

Primary Examiner—Alpesh M. Shah
Attorney, Agent, or Firm—Antonelli, Terry, Stout & Kraus, LLP

[57] ABSTRACT

The present invention relates to a method of search in which a plurality of candidate of character strings likely to coincide with a designated key word are detected from a text character string, and it is decided whether the candidate character strings detected include a character string coincident with the key word character string. Further, the sequence of detection of character string candidates is determined in such a manner that a portion having a succession of characters coincident with any of a plurality of characters included in the key word character string is selected as a candidate character string.

39 Claims, 19 Drawing Sheets

TEXT SEARCH PROCESSING

31 PRIMARY REDUCTION PROCESSING

| KEY WORD CHARACTER | CHARACTER CODE | HASH VALUE | | APPEARANCE MODE INFORMATION | NOTE | |
|---|---|---|---|---|---|---|
| HEI 並 | CAC2 | 082 | (130) | 1100 | POSITION ≤ 2 | HEAD |
| RETSU 列 | CEF3 | 1B3 | (435) | 1001 | POSITION ≤ 2 | LAST |
| KEI 計 | B7D7 | 1D7 | (471) | 1100 | POSITION ≤ 2 | HEAD |
| SAN 算 | BBBB | 0FB | (251) | 1010 | POSITION ≤ 2 | INTERMEDIATE |
| KI 機 | B5A1 | 161 | (353) | 0001 | | |
| SEI 制 | C0A9 | 029 | (41) | 1100 | POSITION ≤ 2, | HEAD |
| GYO 御 | B8E6 | 026 | (38) | 1010 | POSITION ≤ 2, | INTERMEDIATE |
| HOU 方 | CAFD | 0BD | (189) | 0010 | | " |
| HOU 法 | CBA1 | 0E1 | (225) | 0001 | | LAST |

FIG. 8A  OPERATION TABLE OF TEXT COUNTER CONTROL LOGIC 211  211A (156)

| ITEM No. | INPUT CONDITION | OUTPUT SIGNAL | |
|---|---|---|---|
| | $N > i$ | COMPLETION REPORT SIGNAL 140 | TEXT COUNTER CONTROL SIGNAL |
| 1 | 0 | 1 | NOP |
| 2 | 1 | 0 | +1 |

FIG. 8B  OPERATION TRUTH TABLE OF COINCIDENT LENGTH COUNTER CONTROL LOGIC 212  212A

| ITEM No. | INPUT CONDITION | | | | | | OUTPUT SIGNAL |
|---|---|---|---|---|---|---|---|
| | $N > i$ | $\ell = 0$ | $\ell < m \wedge \overline{a_0}$ | APPEARANCE MODE INFORMATION | | | COINCIDENT LENGTH COUNTER CONTROL SIGNAL (132) |
| | | | | $a_1$ | $a_2$ | $a_3$ | |
| 1 | 1 | X | 1 | X | X | X | SET 0 |
| 2 | 1 | 0 | 0 | 0 | 0 | X | SET 0 |
| 3 | 1 | 1 | 0 | 0 | X | X | SET 0 |
| 4 | 1 | 1 | 0 | 1 | X | X | +1 |
| 5 | 1 | 0 | 0 | 1 | X | 1 | +1 |
| 6 | 1 | 0 | 0 | X | 1 | X | +1 |
| 7 | 1 | 0 | 0 | 1 | 0 | 0 | SET 1 |
| 8 | 0 | X | X | X | X | X | NOP |

FIG. 8C  OPERATION TRUTH TABLE OF EFFECTIVE LENGTH COUNTER CONTROL LOGIC 213  213A

| ITEM No. | INPUT CONDITION | | | | | | OUTPUT SIGNAL |
|---|---|---|---|---|---|---|---|
| | $N > i$ | $\ell = 0$ | $\ell < m \wedge \overline{a_0}$ | APPEARANCE MODE INFORMATION | | | EFFECTIVE LENGTH COUNTER CONTROL SIGNAL (134) |
| | | | | $a_1$ | $a_2$ | $a_3$ | |
| 1 | 1 | X | 1 | X | X | X | SET 0 |
| 2 | 1 | 1 | 0 | 1 | X | 0 | SET 0 |
| 3 | 1 | 0 | 0 | X | 0 | 0 | SET 0 |
| 4 | 1 | 1 | 0 | 0 | X | X | SET 0 |
| 5 | 1 | X | 0 | 1 | X | 1 | SET $\ell+1$ |
| 6 | 1 | 0 | 0 | X | 1 | 1 | SET $\ell+1$ |
| 7 | 1 | 0 | 0 | 0 | 0 | 1 | SET $\ell+1$ |
| 8 | 1 | 0 | 0 | X | 1 | 0 | NOP |
| 9 | 0 | X | X | X | X | X | NOP |

FIG. 8D  OPERATION TRUTH TABLE OF RESULT COUNTER CONTROL LOGIC 214 — 214A

| ITEM No. | INPUT CONDITION | | | | | | | OUTPUT SIGNAL |
|---|---|---|---|---|---|---|---|---|
| | $N>i$ | $\ell=0$ | $v<m$ | $\ell<m \wedge \overline{a}_0$ | APPEARANCE MODE INFORMATION $a_1$ | $a_2$ | $a_3$ | RESULT COUNTER CONTROL SIGNAL (136) |
| 1 | 1 | X | 1 | 1 | X | X | X | NOP |
| 2 | 1 | 1 | 1 | 0 | X | X | X | NOP |
| 3 | 1 | 0 | X | 0 | X | 1 | X | NOP |
| 4 | 1 | 0 | X | 0 | 1 | X | 1 | NOP |
| 5 | 1 | 0 | 1 | 0 | X | 0 | 0 | NOP |
| 6 | 1 | 0 | X | 0 | 0 | 0 | 1 | NOP |
| 7 | 0 | X | 1 | X | X | X | X | NOP |
| 8 | 1 | X | 0 | 1 | X | X | X | +1 |
| 9 | 1 | 1 | 0 | 0 | X | X | X | +1 |
| 10 | 1 | 0 | 0 | 0 | X | 0 | 0 | +1 |
| 11 | 0 | X | 0 | X | X | X | X | +1 |

FIG. 8E  TRUTH TABLE OF STORE CONTROL LOGIC 215 — 215A

| ITEM No. | INPUT CONDITION | | | | | | | OUTPUT SIGNAL |
|---|---|---|---|---|---|---|---|---|
| | $N>i$ | $\ell=0$ | $v<m$ | $\ell<m \wedge \overline{a}_0$ | APPEARANCE MODE INFORMATION $a_1$ | $a_2$ | $a_3$ | STORE SIGNAL (122) |
| 1 | 1 | X | 1 | 1 | X | X | X | 0 |
| 2 | 1 | 1 | 1 | 0 | X | X | X | 0 |
| 3 | 1 | 0 | X | 0 | X | 1 | X | 0 |
| 4 | 1 | 0 | X | 0 | 1 | X | 1 | 0 |
| 5 | 1 | 0 | 1 | 0 | X | 0 | 0 | 0 |
| 6 | 1 | 0 | X | 0 | 0 | 0 | 1 | 0 |
| 7 | 0 | X | 1 | X | X | X | X | 0 |
| 8 | 1 | X | 0 | 1 | X | X | X | 1 |
| 9 | 1 | 1 | 0 | 0 | X | X | X | 1 |
| 10 | 1 | 0 | 0 | 0 | X | 0 | 0 | 1 |
| 11 | 0 | X | 0 | X | X | X | X | 1 |

FIG. 9

| TIME | TEXT CHARACTER | APPEARANCE MODE | i(112) | g(113) | v(114) | k(115) | STORE (122) | COMPLETE (140) | ITEM No. (FIG. 5) |
|---|---|---|---|---|---|---|---|---|---|
| 0 | — | 0000 0 | 0 | 0 | 0 | 0 | 0 | 0 | 1 |
| 1 | 行 GYO | 1001 0 | 1 | 0 | 0 | 0 | 0 | 0 | 1 |
| 2 | 列 RETSU | 1100 0 | 2 | 0 | 0 | 0 | 0 | 0 | 14 |
| 3 | 計 KEI | 1010 0 | 3 | 1 | 0 | 0 | 0 | 0 | 3 |
| 4 | 算 SAN | 0001 0 | 4 | 2 | 0 | 0 | 0 | 0 | 7 |
| 5 | 法 HOU | 0000 0 | 5 | 0 | 3 | 0 | 0 | 0 | 13 |
| 6 | お O | 0000 0 | 6 | 0 | 0 | 1 | 1 | 0 | 2 |
| 7 | よ YO | 0000 0 | 7 | 1 | 0 | 1 | 0 | 0 | 14 |
| 8 | び BI | 1100 0 | 8 | 0 | 0 | 1 | 0 | 0 | 14 |
| 9 | 並 HEI | 1001 0 | 9 | 1 | 2 | 1 | 0 | 0 | 3 |
| 10 | 列 RETSU | 1100 0 | 10 | 2 | 0 | 2 | 1 | 0 | 13 |
| 11 | 計 KEI | 1010 0 | 11 | 0 | 0 | 2 | 0 | 0 | 4 |
| 12 | 算 SAN | 0001 0 | 12 | 1 | 3 | 2 | 1 | 0 | 7 |
| 13 | 機 KI | 0000 0 | 13 | 2 | 0 | 3 | 0 | 0 | 13 |
| 14 | の NO | 0010 0 | 14 | 3 | 0 | 3 | 0 | 0 | 2 |
| 15 | 制 SEI | 0001 0 | 15 | 0 | 0 | 3 | 0 | 0 | 3 |
| 16 | 御 GYO | 1010 0 | 16 | 0 | 4 | 3 | 0 | 0 | 7 |
| 17 | 方 HOU | 0010 0 | 17 | 0 | 4 | 3 | 0 | 0 | 7 |
| 18 | 法 HOU | 0001 1 | 18 | 0 | 0 | 4 | 0 | 0 | 13 |
| 19 | — | — — | 19 | — | — | — | 1 | 1 | 17 |

T : READ TEXT CHARACTER
A : GENERATE RAM ADDRESS
R : READ APPEARANCE MODE INFORMATION
C : UPDATE COUNTER
S : WRITE IN MAIN MEMORY UNIT

FIG. 12A  STATE TRANSITION DIAGRAM
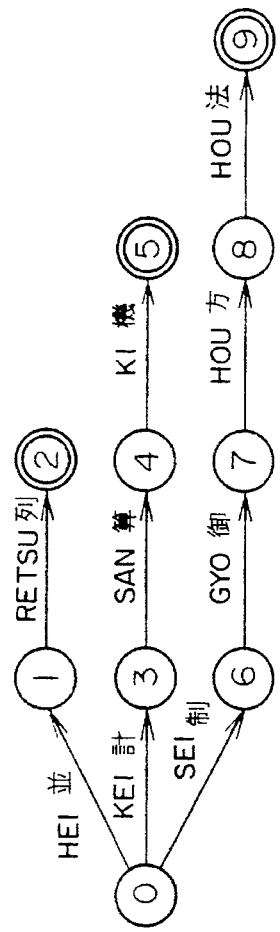
FIG. 12B  STATE TRANSITION TABLE
| ENTRY No. | STATE | INPUT CHARACTER | ENTRY ON SUCCESS | ENTRY ON FAILURE | STATE TYPE | KEY WORD LENGTH |
|---|---|---|---|---|---|---|
| 0 | 0 | 並 HEI | 3 | -1 | INITIAL | — |
| 1 | 0 | 計 KEI | 5 | -1 | — | — |
| 2 | 0 | 制 SEI | 8 | 0 | — | — |
| 3 | 1 | 列 RETSU | 4 | 0 | INTERMEDIATE | — |
| 4 | 2 | — | 0 | 0 | FINAL | 2 |
| 5 | 3 | 算 SAN | 6 | 0 | INTERMEDIATE | — |
| 6 | 4 | 機 KI | 7 | 0 | INTERMEDIATE | — |
| 7 | 5 | — | 0 | 0 | FINAL | 3 |
| 8 | 6 | 制 SEI | 9 | 0 | INTERMEDIATE | — |
| 9 | 7 | 方 HOU | 10 | 0 | INTERMEDIATE | — |
| 10 | 8 | 法 HOU | 11 | 0 | INTERMEDIATE | — |
| 11 | 9 | — | 0 | 0 | FINAL | 4 |

STATE TRANSITION DIAGRAM

| ENTRY No. | STATE | INPUT CHARACTER | FSATBL |
|---|---|---|---|
| 0 | 0 | (NUL) | 0 |
| 1 | 0 | (SOH) | 0 |
| ⋮ | ⋮ | ⋮ | ⋮ |
| 193 | 0 | 'A' | 7 |
| ⋮ | ⋮ | ⋮ | ⋮ |
| 226 | 0 | 'S' | 1 |
| 227 | 0 | 'T' | 16 |
| ⋮ | ⋮ | ⋮ | ⋮ |
| 255 | 0 | (EO) | 0 |
| 256 | 1 | (NUL) | 0 |
| ⋮ | ⋮ | ⋮ | ⋮ |
| 453 | 1 | 'E' | 2 |
| ⋮ | ⋮ | ⋮ | ⋮ |
| 511 | 1 | (EO) | 0 |
| 512 | 2 | (NUL) | 0 |
| ⋮ | ⋮ | ⋮ | ⋮ |
| 705 | 2 | 'A' | 3 |
| ⋮ | ⋮ | ⋮ | ⋮ |
| 5119 | 19 | (EO) | 0 |

TRANSITION DESTINATION

ACCEPTANCE VECTOR

| STATE | ACCPT |
|---|---|
| 0 | 0 |
| 1 | 0 |
| 2 | 0 |
| 3 | 0 |
| 4 | 0 |
| 5 | 0 |
| 6 | 6 |
| 7 | 0 |
| 8 | 0 |
| 9 | 0 |
| 10 | 0 |
| 11 | 0 |
| 12 | 0 |
| 13 | 0 |
| 14 | 0 |
| 15 | 9 |
| 16 | 0 |
| 17 | 0 |
| 18 | 0 |
| 19 | 4 |

KEY WORD LENGTH

PARAMETER

| KEY WORD KEY | STATE TRANSITION DESTINATION VECTOR F SATBL | | TEXT VECTOR TEXT | | HEAD POSITION VECTOR TOP | | ACCEPTANCE VECTOR ACCPT |
|---|---|---|---|---|---|---|---|
| S | 0 | 0 | 1 | S | 1 | 1 | 0 |
| E | 1 | 0 | 2 | E | 12 | 2 | 0 |
| A | : | : | 3 | A | 17 | 3 | 0 |
| R | 193 | 7 | 4 | R |  | 4 | 0 |
| C | : | : | 5 | C | CANDIDATE LENGTH VECTOR LNG | 5 | 0 |
| H | 226 | 1 | 6 | H |  | 6 | 6 |
|  | 227 | 16 | 7 |  |  | 7 | 0 |
| A | : | : | 8 | A | 6 | 8 | 0 |
| L | 255 | 0 | 9 | N | 4 | 9 | 0 |
| G | 256 | 0 | 10 | D | 9 | 10 | 0 |
| Ō | : | : | 11 |  |  | 11 | 0 |
| R | 453 | 2 | 12 | S |  | 12 | 0 |
| I | : | : | 13 | Ō | STATE VECTOR STATE | 13 | 0 |
| T | 511 | 0 | 14 | R |  | 14 | 0 |
| H | 512 | 0 | 15 | T | 0 | 15 | 9 |
| M | : | : | 16 |  | 0 | 16 | 0 |
|  | 705 | 3 | 17 | A | 0 | 17 | 0 |
| T | : | : | 18 | L | 1706 | 18 | 0 |
| E | 5119 | 0 | 19 | G |  | 19 | 4 |
| X |  |  | 20 | Ō |  |  |  |
| T |  |  | 21 | R | SEARCH RESULT POSITION VECTOR RTOP |  |  |
|  |  |  | 22 | I |  |  |  |
|  |  |  | 23 | T |  |  |  |
|  |  |  | 24 | H | 1 |  |  |
|  |  |  | 25 | M | 17 |  |  |

SEARCH RESULT LENGTH VECTOR RLNG

| 6 |
| 9 |

PROCESS OF STATE TRANSITION

① FIRST STATE TRANSITION

| TOP | INCH | STATE | LNG |
|---|---|---|---|
| 2 | S | 1 | 5 |
| 13 | S | 1 | 3 |
| 18 | A | 7 | 8 |

② AFTER SECOND STATE TRANSITION

| 3 | E | 2 | 4 |
| 14 | Ō | 0 | 2 |
| 19 | L | 8 | 7 |

③ AFTER THIRD STATE TRANSITION

| 4 | A | 3 | 3 |
| 15 | R | 0 | 1 |
| 20 | G | 9 | 6 |

④ AFTER 4TH STATE TRANSITION

| 5 | R | 4 | 2 |
| 16 | T | 0 | 0 |
| 21 | Ō | 10 | 5 |

⑤ AFTER 5TH STATE TRANSITION 1711

| 6 | C | 5 | 1 |
| 22 | R | 11 | 4 |

⑥ AFTER 6TH STATE TRANSITION

| 7 | H | 6 | 0 |
| 23 | I | 12 | 3 |

⑦ AFTER 7TH STATE TRANSITION 1712

| 24 | T | 13 | 2 |

FIG. 18

KEY WORD : 'TEXT'·'SEARCH'

TEXT : 'HASH△AND△SEARCH'     △ = BLANK

|  | APPEARANCE MODE VECTOR KWD |  |  | TEXT VECTOR TEXT |
|---|---|---|---|---|
| 'AA' | 0 | ~181 | | H A | ~182 |
| 'AB' | 0 | | | A S |
| ⋮ | ⋮ | | | S H |
| 'AR' | 1 | | | H △ |
| ⋮ | ⋮ | | | △ A |
| 'CH' | 1 | | | A N |
| ⋮ | ⋮ | | | N D |
| 'EA' | 1 | | | D △ |
| ⋮ | ⋮ | | | △ S |
| 'EX' | 1 | | | S E |
| ⋮ | ⋮ | | | E A |
| 'RC' | 1 | | | A R |
| ⋮ | ⋮ | | | R C |
| 'SE' | 1 | | | C H |
| ⋮ | ⋮ |
| 'TE' | 1 |
| ⋮ | ⋮ |
| 'XT' | 1 |
| ⋮ | ⋮ |
| 'ZY' | 0 |
| 'ZZ' | 0 |
| '△A' | 0 |
| ⋮ | ⋮ |
| '△△' | 0 |

| PROGRAM | REDUCTION RATE: $\beta$ | CPU TIME | PERFORMANCE RATIO |
|---|---|---|---|
| SCALAR FSA | — | 13.7ms | 1 |
| VECTORIAL PRIMARY REDUCTION +VECTORIALIZATION | 0.015 | 1.04ms | 13.2 |
| VECTORIAL PRIMARY REDUCTION +VECTORIALIZATION | 0.8 | 2.71ms | 5.05 |

METHOD OF AND VECTOR PROCESSOR FOR SEARCHING TEXT FOR KEY WORDS BASED ON CANDIDATE CHARACTER STRINGS OBTAINED FROM THE TEXT USING PARALLEL PROCESSING

TECHNICAL FIELD

The present invention relates to a method and a system for searching for a character string or the like, or more in particular to a data search method and system effective in searching for a specific character string or a key word from a great amount of character strings in a reference or the like.

BACKGROUND ART

In the prior art, in a method known to be effective for a key word search from a great amount of character strings, a state transition diagram is prepared from a key word and each character making up a character string of a text to be searched is checked with the state transition diagram to implement a key word search. See A. Aho et al., "Efficient String Matching: An Aid to Bibliographic Search", *Communications of the ACM,* Vol. 18, No. 6, June 1975, pp. 33–340.

In the aforementioned prior art (hereinafter called then "FSA method"), assume, for example, that three key words are provided including "HEI RETSU" (並列) (a phrase comprising two kanji characters meaning "parallel"), "KEI SAN KI" (計算機) (a phrase comprising three kanji characters meaning "computer") and "SEI GYO HOU HOU" (制御方法) (a phrase comprising four kanji characters meaning "control method"). A transition diagram is prepared as shown in FIG. 12A which is stored in the form of the state transition table of FIG. 12B. Each character of the text is checked sequentially with this transition table for a search. In the example of FIG. 12A, if the character of the input text is "HEI" (並), transition is made to state 1; if the character is "KEI" (計), transition is made to state 3; and if the character is "SEI" (制), transition is made to state 6. If the text character is "RETSU" in state 1, transition is made to state 2. Since state 2 is the final state, it is known that the key word "HEI RETSU"(並列), has been searched for. With regard to the other key word "KEI SAN KI" (計算機), or "SEI GYO HOU HOU" (制御方法), it is known whether these key words have been searched for or not by determining whether transition is made to state 5 or 9 respectively. In this way, the FSA method is an efficient method capable of searching for a plurality of key words. The actual processing of searching a character string by the FSA method is realized by a program as shown in FIG. 12C. The FSA method, though superior as described above, has the problem of sequential processing. As shown in FIG. 12C, in the FSA method, after initialization (step 1203), whether the present state is the final one is checked (step 1205) at each time of application of one text character (step 1204), and if so, the position and the length of the text in which a key word has been found is produced (step 1206). And the state transition table is checked from the present state and the text characters thereby to determine the state to which the next transition is to be made (steps 1207 to 1211), so that the state and the text position are updated (step 1211). A similar processing is repeated for the next text characters.

Specifically, the state of the destination of transition is determined only at the end (step 1212) of the processing of each text character, and the processing of the next text character cannot be started until the determination of the state of the destination of transition. As a result, the processing becomes essentially sequential. In the case where an attempt is made to increase the search speed by use of a parallel processing technique such as the pipeline processing with an exclusive hardware, however, the above-mentioned sequential characteristic poses the problem of inapplicability of the search by the FSA method.

Accordingly, an object of the present invention is to provide a method and a system for character string search suitable for searching for a key word at high speed from a text character string in a great amount of character strings.

Another object of the present invention is to provide a new method and a system for character string search suitable for increasing the processing speed by parallel processing such as the pipeline processing.

Still another object of the present invention is to provide a method of character string search in which the character string search processing based on the FSA method is executable by vectorial processing with a vector computer.

DISCLOSURE OF THE INVENTION

Specifically, the present invention provides a method of search in which a plurality of candidate character strings likely to coincide with a designated key word are detected from among text character strings, and it is decided whether or not the candidate character strings detected contain a character string coincident with the key word character string. Further, in the process of detecting a candidate character string, a portion having a succession of characters coincident with any of a plurality of characters included in a key word character string is detected as a candidate character string.

Furthermore, the vector processor according to the present invention comprises; means for holding a text vector including an element representing each character of a text character string and an appearance mode vector including an element representing the appearance mode of each character of the text character string, in which each element of the appearance mode vector represents the appearance mode in a plurality of key words of a corresponding character including the appearance mode as to whether the corresponding character coincides with any of the characters contained in a plurality of the key words; first read means for reading the elements of the text vector sequentially; second read means for sequentially reading the elements of the appearance mode vector corresponding to the read elements respectively; and means for detecting a portion (candidate character string) having a succession of characters coinciding with a character contained in a plurality of key word strings in the text vector in response to the element of the appearance mode vector read out.

BRIEF DESCRIPTION OF THE DRAWINGS

FIG. 9 is a diagram showing an example of operation history in the embodiment of FIG. 1, FIGS. 12A–12C are diagrams for explaining the conventional FSA method, FIG. 18 is a diagram showing a configuration of data used for improving the method of character string search shown in FIG. 13.

BEST MODE FOR CARRYING OUT THE INVENTION

Figure 1:
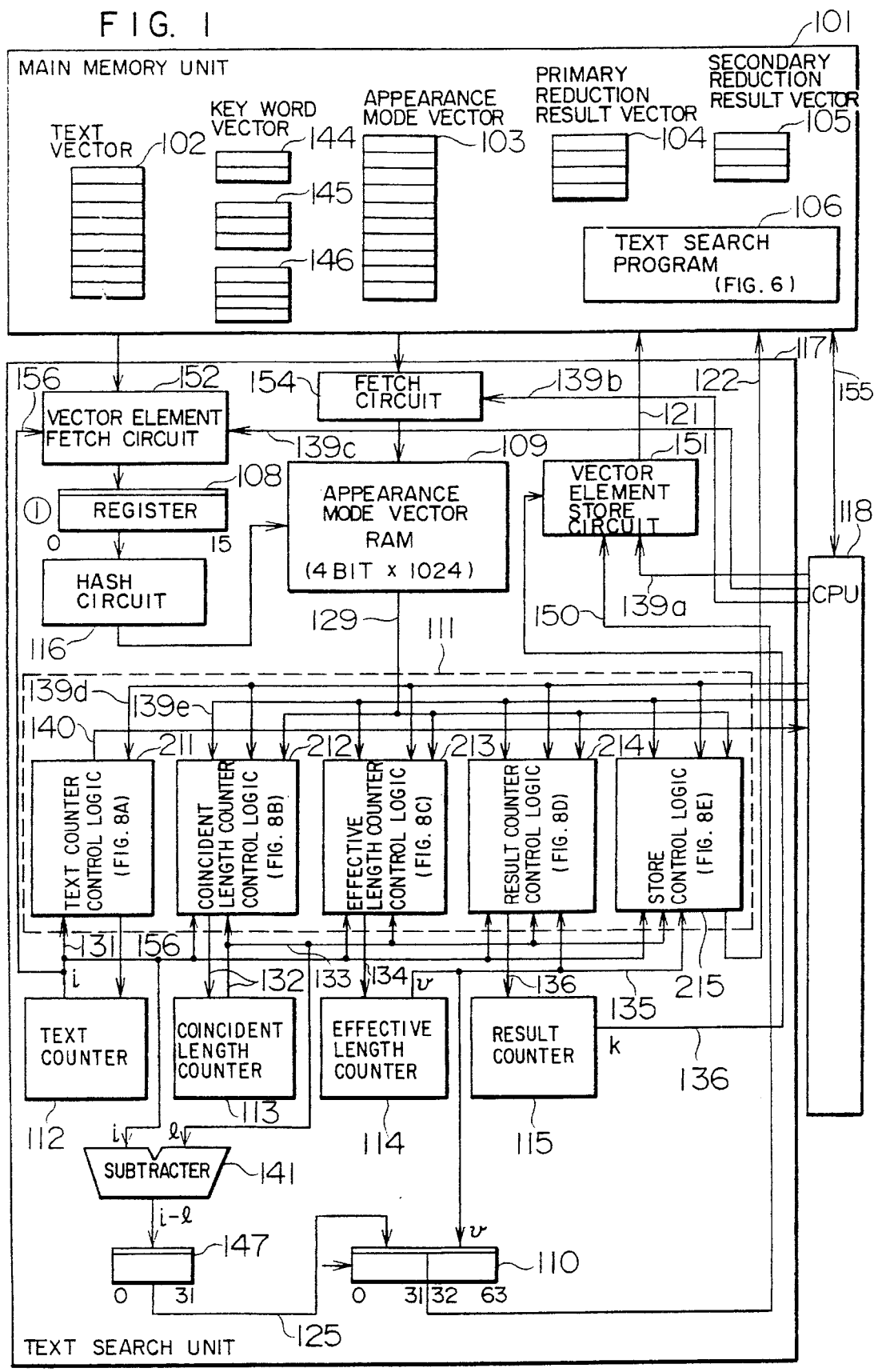
FIG. 1 is a diagram showing a configuration of an embodiment of a character string search system according to the present invention.

According to the present invention, in order to achieve the above-mentioned objects, there are executed a first step of detecting information on a candidate character string group including a key word character string and a character string analogous thereto from a text character string, and a second step of selecting information corresponding to the key word character string from the information on the candidate character string group obtained in the first step. By subjecting the first step to a pipeline-like processing, in particular, a great amount of text character strings are reduced at high speed so that information on the candidate character string group is produced at high speed thereby to realize a high-speed processing of character search as a whole.

In the primary reduction processing at the first stage, a candidate character group most likely to contain a key word character string is searched for. In the secondary reduction processing of the second stage, on the other hand, a key word string is searched for from the candidate character group mentioned above.

The secondary reduction processing may be carried out by a conventional method of character string search or the conventionally-known FSA method explained vectorially as an embodiment of the present invention.

The primary reduction processing is for searching for a candidate character string but not for a key word character string itself. This processing can be carried out by pipeline or parallel processing with a vector computer or an exclusive device for pipeline operation as shown in the embodiments described below, and therefore a processing very high in speed is realized.

The above-mentioned first step, as a pre-processing, is to produce an appearance mode information on the state assumed in a key word character string by all types of characters appearing in a text character string to be searched.

After this pre-processing, the information on each character is sequentially recovered from the information on the text character string, checked with the appearance mode information and converted into an individual appearance mode information.

At the same time, the information on the length of a candidate character string under search is held in a counter.

Then, by use of the above-mentioned individual appearance mode information and length information, it is determined whether each character recovered sequentially is to be added to the candidate character string, and the length information in the counter is updated on the basis of the determination.

If in the aforementioned process it is decided that the character information under search from the individual appearance mode information is the one relating to one of candidate character strings, the length information and the information on the position thereof in the text character string are produced as information on the candidate character string.

The appearance mode information includes, in a most simple case, 1-bit information as to whether the characters appear in a single or a plurality of key word character strings, information on the position (first, last, intermediate, etc.) in a key word character string as will be explained in detail with reference to embodiments of the present invention, and information on whether the number of the characters is less than that in the shortest key word of the key word character string.

In another embodiment of the present invention for executing the first step, the above-mentioned appearance mode information is generated as an appearance information vector, the appearance information corresponding to each character in the appearance information vector is read for each character in the text character string, a detection state vector providing an element is generated in a form primarily corresponding to each character in the text character string, and it is determined whether each corresponding character in the text character string makes up a candidate character string by use of the appearance information stored in the detection state vector.

The above-mentioned method according to another embodiment is realized by a vector computer having the four fundamental rules of arithmetic functions. In executing the primary reduction processing by the vector computer, the text character string information is converted into a detection information vector having an element in the form of information as to whether each character is one appearing in a key word character string, and from the arrangement of the same detection information vector elements, it is decided vectorially whether it makes up a candidate character string. The detection information vector may be generated independently in advance of the decision, and the vectorial decision processing may be prallelly implemented very simply by computation of an error between vectors and the relocation of the vector elements based on an indirect address, thereby realizing a high-speed processing.

Although a conventionally-known method of character string search is applied to the above-mentioned second step, the conventional FSA method executed vectorially may alternatively be used for realizing the same object. Specifically, the candidate character string group obtained in the first step is considered to be plurality of partial character strings, and search position information is prepared which indicates a character on the partial character strings providing an object of search. Characters are then read on the basis of the search position information from the partial character strings, the characters thus read are rearranged as an input character vector, and a state vector is held representing a state indicating a key word character in the key word string up to which each partial character string coincides with at a given time point of search processing. For each of the partial character strings, the input character vector and the state vector are used to generate a state transition vector from the key word character string for transition to a new coincidence state. Then, by use of the state transition vector, the state transition is effected for each partial character string on the basis of the state vector held as above and the input character vector, and an acceptance decision is made to determine whether a key word character string has been detected for each element of the state vector.

This method of vectorial processing of the FSA method is applicable not only to the result of the primary reduction processing mentioned above but also in the case where a vector is prepared having a vector element taken out of each of a plurality of partial character strings satisfying a predetermined condition into which the input text character string may be divided, so that the processing of the FSA method is applied to each element of such a vector thereby to realize the parallel pipeline processing by the FSA method.

An exclusive means for executing the above-mentioned first step is configured to include memory means for storing the above-mentioned appearance mode information, input means for applying each character information of the text character string to be searched at regular intervals of time, address means for changing each character information into an address signal, means for producing an individual appearance mode information of an address designated by the address means, a counter for counting the length of the candidate character string under search, and counter control means supplied with the counter value and the individual appearance mode information to decide whether or not the text character following the candidate character string under detection is to be added to the candidate character string and to update the counter value accordingly.

In the case where the above-mentioned primary reduction processing is to be realized by an exclusive device, the processing of a character requires the steps of reading a character from a text character string, changing the particular character into an address of the memory means and reading appearance mode information from the stored information. The appearance mode information is the one indicating whether a character to be processed therein appears in a key word character string and if it appears, the position thereof in the key word character string. This information is, therefore, determined primarily without taking the relationship with other characters into consideration. As a result, an advance reading is possible without regard to the counter value representing the search condition, so that a succession of a plurality of characters may be processed partially in duplex fashion, that is, while the counter value for a character is being updated, the appearance mode information is read for the next character. As for the next character but one, on the other hand, the text character string may be converted into the address information. In this way, the pipeline processing is performed, thereby realizing a high-speed processing.

EMBODIMENT 1

FIG. 1 is a diagram showing a configuration of an embodiment of a data string search system for embodying a data string search method according to the present invention.

The explanation that follows will deal with the case of searching for a partial character string coinciding with a key word from a character string such as a text.

(A) Summary 101 designates a main memory unit, 117 a text search unit characterizing the present invention, and 118 a central processing unit (CPU).

The CPU 118 fetches an instruction from a text search program 106 contained in the main memory unit 101, and executes the particular instruction if it is of scalar type, while energizing the text search unit 117 if the instruction is a vectorial one. The main memory unit 101 has various vector data stored therein.

A vector data or a vector is defined as an assembly of a plurality of vector elements (or elements) which are arranged in the main memory unit 101 at predetermined address intervals. According to the present embodiment, the main memory unit 101 has stored in advance therein a text vector 102 having characters making up a text to be searched as elements, and a plurality of key word vectors 144 to 146 having characters included in a plurality of key words used for search as elements. The text search unit 117 is one for subjecting these vectors to a vectorial processing. The vectorial processing is defined as a processing of vectors in pipeline fashion.

Figure 3:
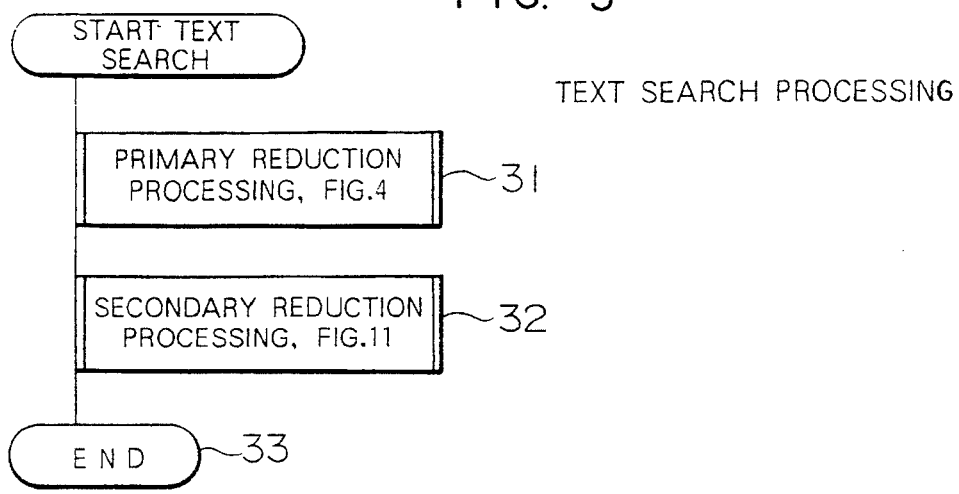
FIG. 3 is a flowchart for the character string search processing by the system of FIG. 1.

In the present embodiment, the processing by the text search program 106 includes two steps as shown in FIG. 3.

First, a primary reduction processing 31 detects a partial character string (hereinafter called "the candidate character string") likely to coincide with any of the key word vectors 144 to 146 from among the partial character strings in the text vector 102, and generates a primary reduction result vector 104 having as an element the information designating a candidate character string. Before this detection, an appearance mode vector 103 is prepared by use of the CPU 118 from the text search program 106. The primary reduction processing 31 is effected vectorially by the text search unit 117 using the text vector 102, a plurality of the key words 144 to 146 and an appearance mode vector 103.

In the secondary reduction processing 32, a candidate character string truly coinciding with any of the key words is selected of all the candidate character strings produced from the primary reduction processing 31, and a secondary reduction result vector 105 is generated with the information designating a selected candidate character string as an element.

This secondary reduction processing 32 is effected in scalar fashion by the conventional FSA method using the CPU 118 shown in FIG. 1. Since the object of processing is limited, the whole processing is increased in speed even though the conventional method is used for part of the processing.

As explained above, a first feature of the present embodiment lies in that candidate character strings are selected by the primary reduction processing and an object character string is looked for by the secondary reduction processing from among the candidates thus selected. A second feature of the present embodiment resides in that the primary reduction processing is executed at high speed in vectorial fashion. Further, a third feature lies in that the vectorial processing is effected at high speed by using a circuit specific to the present invention.

Figure 2:
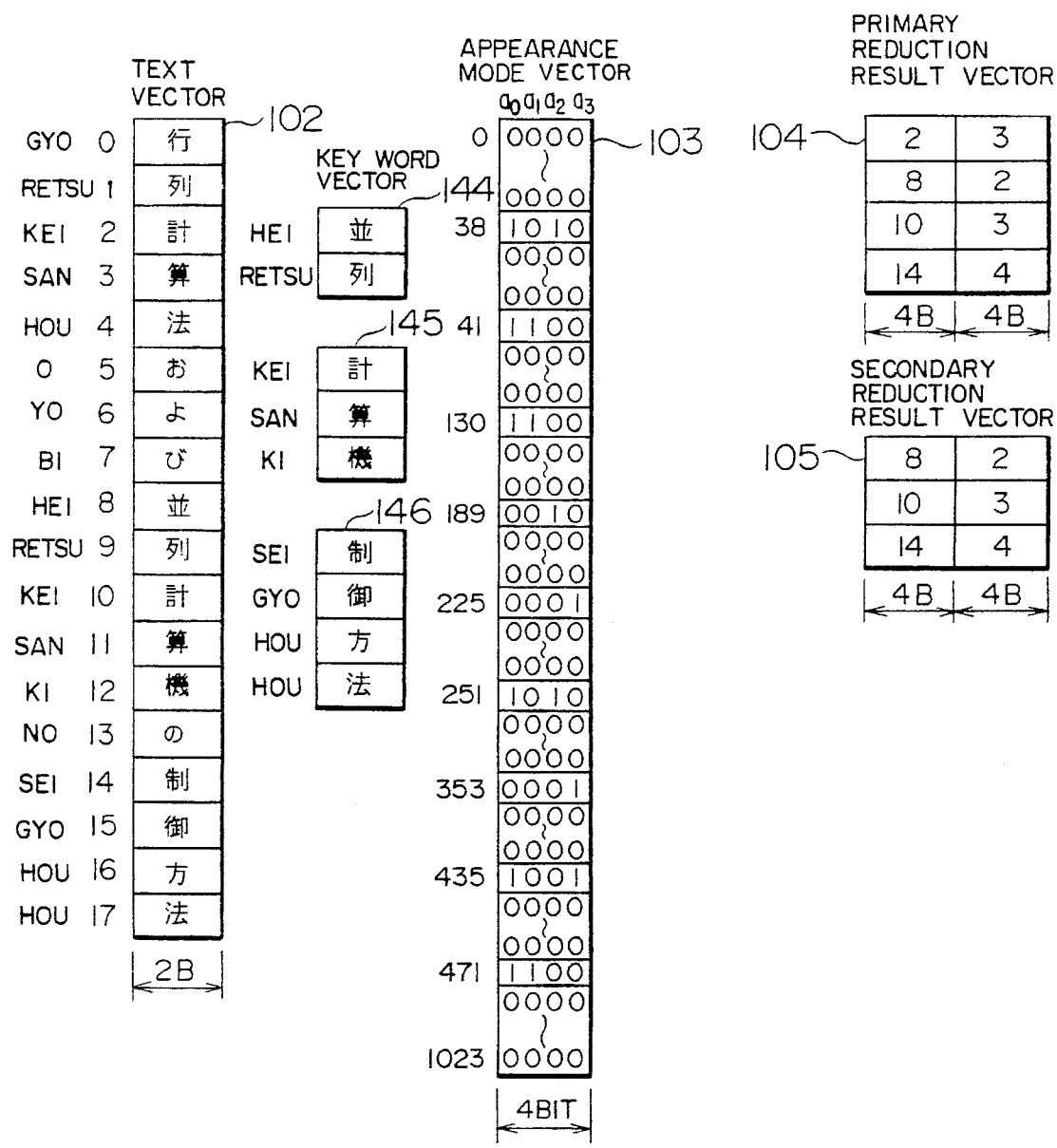
FIG. 2 is a diagram showing an example of vector data used for the system of FIG. 1.

FIG. 2 shows an example of values of various vector elements stored in the main memory unit 101. Assume that the text vector 102 has as elements thereof the characters included in "GYOU RETSU KEI SAN HOU O YO BI HEI RETSU KEI SAN KI NO SEI GYO HOU HOU ("Matrix Computation Method and Method of Control of Parallel Computer" (行列計算法及び並列計算機の制御方法). The key words groups 144 to 146 have respective sets of "HEI RETSU" ( ), "KEI SAN KI" (計算機) and "SEI GYO HOU HOU" (制御方法) as elements thereof. By way of simplification, the diagram indicates the contents of these vector elements by characters. Actually, however, each set is stored in the form of a 2-byte character code. The numeral to the left of the text vector indicates the number of each element of the particular vector.

Each element of the primary reduction result vector 104 is made up of a pair of information including an element number in the text vector 102 of the leading character of a candidate character string and the length of the candidate character string. In FIG. 2, for instance, the element (2, 3) indicates that the character string "KEI SAN HOU" (計算法) having the length of 3 starting from the character "KEI" (計) of the element number 2 in the text vector 102 represents a first candidate character string. After all, the primary reduction result vector 104 indicates that the candidate character string group, in addition to "KEI SAN HOU" (計算法) mentioned above, represents "HEI RETSU" (並列) having the length of 2 starting from the eighth element of the text vector 102, "KEI SAN KI" (計算機) having the length of 3 starting from the tenth element and SEI GYO HOU HOU (制御方法) having the length of 4 starting from the 14th element. It is seen that "KEI SAN HOU" (計算法) fails to coincide with any of the key words but is detected as one of the candidate character strings.

The structure of each element of the secondary reduction result vector 105 is indicated by the same method of inscription as in the case of the primary reduction result vector 105. In this example, of the above-mentioned four candidate character string groups, "KEI SAN HOU" (計算法) is not included in the key word group of 144, 145 and 146 and therefore the data (2, 3) for this candidate is removed as noise. It is thus seen that only the data (8, 2), (10, 3) and (14, 4) for "HEI RETSU" (並列) KEI SAN KI" (計算機) and "SEI GYO HOU HOU" (制御方法) make up the elements of the secondary reduction result vector 105.

In this way, according to this embodiment, the secondary reduction processing 32 is effected only for the candidate character strings produced by the primary reduction processing 31, and therefore the whole text search is increased in speed much more than in the prior art even if the secondary reduction processing 32 is effected in scalar fashion by the conventional FSA method.

If the speed of the whole text search is to be increased, however, it is necessary to increase the speed of the primary reduction processing 31. For this purpose, according to the present embodiment, this processing 31 is effected in vectorial manner. In the conventional FSA method, the transition state of a given character in a text character string is determined on the basis of the transition state thereof against the preceding character. As a result, this method makes it inevitable to decide a combination of successive characters. In such a method, it is impossible to process characters in the text vector 102 in succession.

In view of this, according to the present embodiment, a method described below is employed without using a transition state unlike in the FSA method.

(1) Whether each character in the text vector 102 is one contained in the key word groups 144 to 146 (a character appearing in the key word) is decided independently of the other characters.

(2) A string of successive characters appearing in the key word in the text vector 102 as obtained from this decision is discriminated as a candidate character string.

For the step (1) mentioned above, or in order to execute this step at high speed, the present embodiment uses an appearance mode vector 103.

This vector 103 is for holding an appearance mode indicating whether each of all the characters likely to be used for the text vector 102 is to be used for the key word vectors 144 to 146.

For each of the characters of the text vector 102, it is possible to decide whether or not the particular character is included in the key word vector groups 144 to 146 with reference to an appropriate element in the vector 103. In addition, this decision is made possible at high speed by preparing the vector 103 in advance. For this purpose, the appearance mode vector 103 should have the information as to whether a given character is the one included in the key word vector groups 144 to 146 (a character appearing in a key word).

According to the present invention, however, whether a corresponding character appears in a given key word and, if so, the manner in which it appears in the particular key word, are indicated by use of the 4-bit information as shown in FIG. 2 as an appearance mode for a given character.

Of all of these bits, the 0-th bit $a_0$ is set to "1" when a corresponding character appears in any of the key word vectors and the position of appearance in the particular key word is smaller than the shortest key word length (m).

The first to third bits ($a_1$ to $a_3$) are set when a corresponding character appears in any of the key word vectors and the position thereof is at the top, intermediate or the last in the key word respectively. In FIG. 2, for instance, the 130th element "1100" is associated with "HEI" (並). Since "HEI" (並) appears at the top of the shortest key word "HEI RETSU" (並列), the bits $a_0$ and $a_1$ are both "1". By using these four bits, an unrequired candidate character string is reduced as described later with reference to these four bits on the one hand, and the length of the candidate character string selected is shortened as far as possible on the other.

By the way, although each element of the appearance mode vector should correspond to a character, the reduction in the length of the vector according to the present embodiment results in that each element is comprised of four bits resulting from the logic sum of the bits of the appearance mode map (four bits) for a plurality of characters.

The summary of the text search unit 117 in FIG. 1 and the detailed operation thereof will be explained later.

Now, the processing of the above-mentioned embodiment and the operation of the system will be explained in detail.

(B) Primary reduction processing

Figure 4:
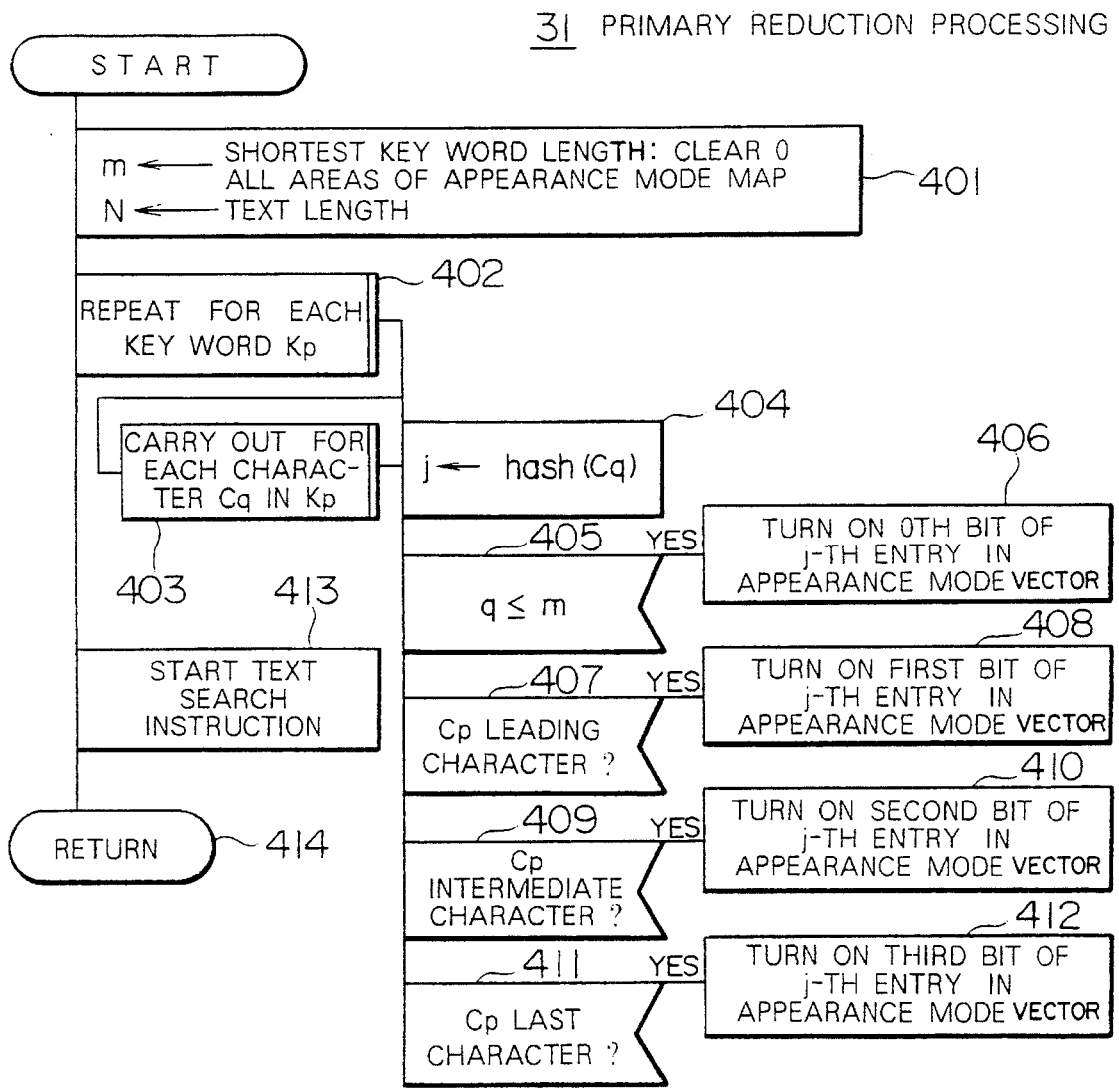
FIG. 4 is a detailed flowchart of a primary focusing processing 31 in FIG. 3.

FIG. 4 is a flowchart showing the contents of the above-mentioned primary reduction processing routine 31.

(1) Initialization (step 401)

The CPU (118) makes initialization first of all in accordance with a search program 106. Specifically, the length of the smallest number of characters of all the key words (the shortest key word length) (in the case of FIG. 2, the shortest key word is "HEI RETSU" (並列) among the key words 144, 145 and 146, and the length thereof is 2) is substituted into a program variable m, all the entries of the appearance mode vector 103 are cleared, and the maximum element number (17 in this case) of the text vector 102 is substituted into a program variable N (step 401).

(2) Generation of the appearance map vector 103 (steps 402 to 411)

As the next step, each character in the key word vectors 144 to 146 is checked to prepare an appearance mode vector 103. As mentioned above, this vector is for indicating whether each of all the characters which may appear in the text vector 102 actually appears in any of a plurality of key word vectors 144 to 146 and, if any appears, holding the manner of appearance thereof. Specifically, with regard to each key word vector (step 402), the code Cq (meaning the q-th character in the key word vector) of a character in each of the key word vectors is sequentially recovered (step 403), and Cq (including 16 bits) is converted into a smaller number of bits (10 bits), thus obtaining the result value j (step 404). This conversion is a technique generally called hashing in which a character code is converted into a code shorter than the bit length of a given code and will hereinafter be also called so. Upon hashing, the length of the appearance mode vector (total number of elements) becomes smaller. The appearance mode vector 103, as will be explained later, is utilized in the form stored in an appearance mode vector RAM 109 in the text search unit 117. The hashing is effected in order to reduce the required capacity of this RAM 109. In the case under consideration, if an element is used for each of all the 16-bit character codes, a RAM would require 256K bits. If an element is provided for a 10-bit code after hashing, however, the requirement is reduced to only 1/64, although the hashing should of course be avoided, if possible.

Figures 5, 6:
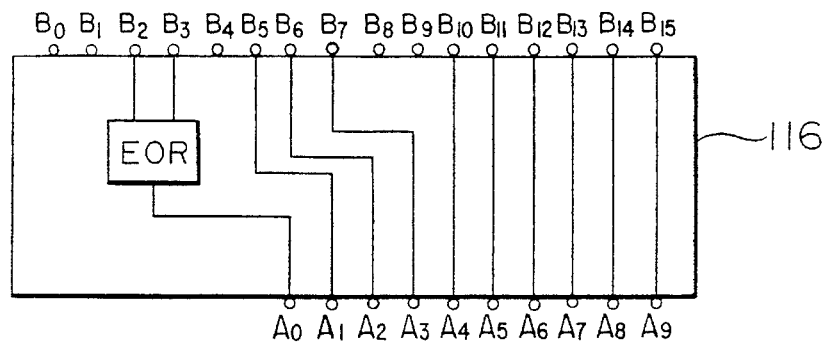
FIG. 5 is a diagram for explaining the hash processing used in the embodiment of FIG. 1.
FIG. 6 is a diagram showing an example of the attributes of a key word in the embodiment of FIG. 1.

FIG. 5 is a diagram showing a method of hashing. $B_0$ to $B_{15}$ designate 16 bits of the character code Cq, and $A_0$ to $A_9$ 10 bits obtained by hashing. Of the bits $B_0$ to $B_{15}$, those not connected with the outputs $A_0$ to $A_9$ are ignored as indicated. Specifically, according to the hash method, the exclusive logic sum (EOR) of the bits $B_2$ and $B_3$ is $A_0$; each of the bits $B_5$, $B_6$ and $B_7$ is equal to $A_1$, $A_2$ and $A_3$ respectively; and the bits $B_{10}$ to $B_{15}$ remain $A_4$ to $A_9$ respectively. FIG. 6 is a table summarizing the character codes, the result of hashing and the appearance mode information of each character in the key words 144 to 146. This table shows hash values in hexidecimal notation followed by those in decimal notation in parentheses. As to the character "HEI" (並), for example, the character code (say, KEIS code) thereof is CAC2, and the result of hashing as shown in FIG. 5 is 82 (hexadecimal) (130 in decimal notation).

Now, the appearance mode of the character Cq will be checked. First, the appearance position (qth) of the character Cq is compared with the shortest key word length m (step 405), and if the appearance position q in the key word is before m, "1" is raised at the 0th bit $a_0$ of the j-th entry in the appearance mode vector 103 (step 406). Whether the second character Cq appears at the top of the key word is checked (step 407), and if it does so, the first bit $a_1$ in the j-th entry of the appearance mode vector 103 is set to "1" (step 408). In similar fashion, it is checked whether the character Cq appears in the middle (other than the top and the end) of the key word (step 409), or the character Cq appears at the end of the key word (step 411), so that the second bit $a_2$ and the third bit $a_3$ of the j-th entry in the appearance mode vector 103 are set to "1" respectively (steps 410, 412). The appearance mode vector 103 is prepared in this way.

Assuming that the character "HEI" (並) appears at a position before the shortest key word length 2 and is the character at the top of the key word "HEI RETSU" (並列) as shown in FIG. 6, for example, the 0th bit and the first bit of the appearance mode information become "1". Also, it is not appearing in the middle or at the end, and therefore the second and third bits become "0". As a result, the 130th entry of the appearance mode vector 103 is "1100". The same can be said of the other key words as the appearance mode information of four bits are stored at a position indicated by the hash value in FIG. 6 in the appearance mode vector 103. As for the characters whose key word fails to appear, the corresponding appearance mode information remains "0000". By the way, as a result of the above-mentioned hashing, characters appearing in two different key words may take the same hash value. In such a case, the logic sum of the appearance mode information for such two characters is stored in the entry of a common hash value thereof.

(3) Brief description of the text search unit 117 and operation

Now, after completion of the preparation of the appearance mode vector 103 by steps 402 to 412, a text search instruction is issued (step 413).

This instruction is mainly executed by the text search unit 117. Before describing the processing of this unit, the system will be explained briefly.

In FIG. 1, 109 designates a RAM for storing the appearance mode vector 103, and 154 a fetch circuit for fetching all the elements of the appearance mode vector 103 in the main memory unit 101 and transferring them to the RAM 109. 152 designates a fetch circuit for fetching the elements of the text vector 102 sequentially, 108 a register for temporarily holding the fetched elements only for a one-clock period, and 116 a circuit for hashing the vector elements held in the register 108 (that is, the character codes present in the text vector 102) in the same manner as shown preparing the appearance mode vector 103 (FIG. 6), whereby an address of an entry corresponding to the character codes is prepared of the appearance mode vector RAM 109, from which entry, a corresponding appearance mode is read out. By using this map, the control logic circuit group 111 and the counters 112 to 115 decide whether the above-mentioned character is one to be detected as one of the candidate character string or writes it as an element of the primary reduction result vector in the main memory unit for the candidate character string already detected.

The text counter 112 counts the element number i in the text vector 102 of the character being processed, and the coincident length counter 113 counts the length l of the candidate character string being processed. The effective length counter 114 counts the length v of an effective candidate character string being processed in the case where the next character cannot be added to the candidate character string being processed, and the result counter 115 counts the number k of a candidate character string thus far detected.

The subtracter 141 determines the element number of the leading element of the candidate character string detected from the difference i-l between the value i of the text counter 112 and the value l of the coincident length counter 113. This number represents, together with the value v of the effective length counter 114, the result of primary reduction for the particular character string and is written in the main memory unit by the vector element store circuit 151.

Figure 10:
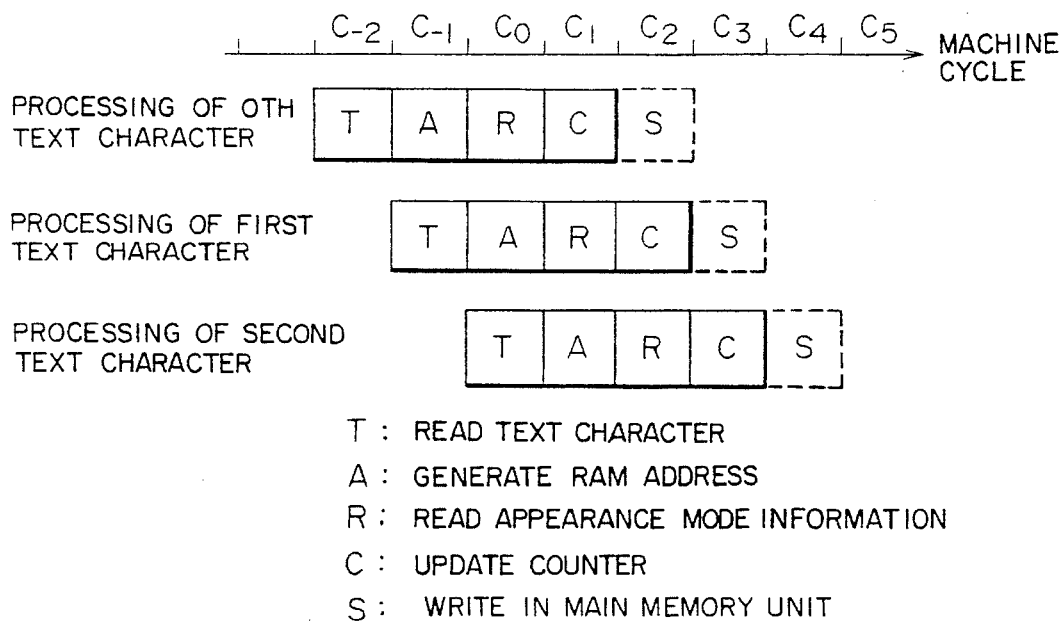
FIG. 10 is a time chart for the pipeline operation in the embodiment of FIG. 1.

FIG. 10 is a diagram showing the chronological relationship of the various parts in the primary reduction processing by the text search unit shown in FIG. 1. The processing of the text search unit is such that the step T of reading the text character (that is, application from the output of the fetch circuit 152 to the input of the register 108), the address generation A of the RAM 109 by the hash circuit 116, the step R of reading the appearance mode information from the RAM 109, the processing C of updating the counter, and the step S of writing into the main memory unit for a candidate character string already detected, are carried out in time series for a single input character. The write step S, however, is not always carried out in every cycle and is shown a dotted line in the diagram. As shown in FIG. 10, different processings for different characters are duplexed in machine cycles $C_{-2}, C_{-1}, C_0, C_1 \ldots$ for a plurality of successive characters and subjected to a pipeline processing, so that the processing of one text character is completed apparently in one machine cycle.

(4) Text search instruction

Figure 7:
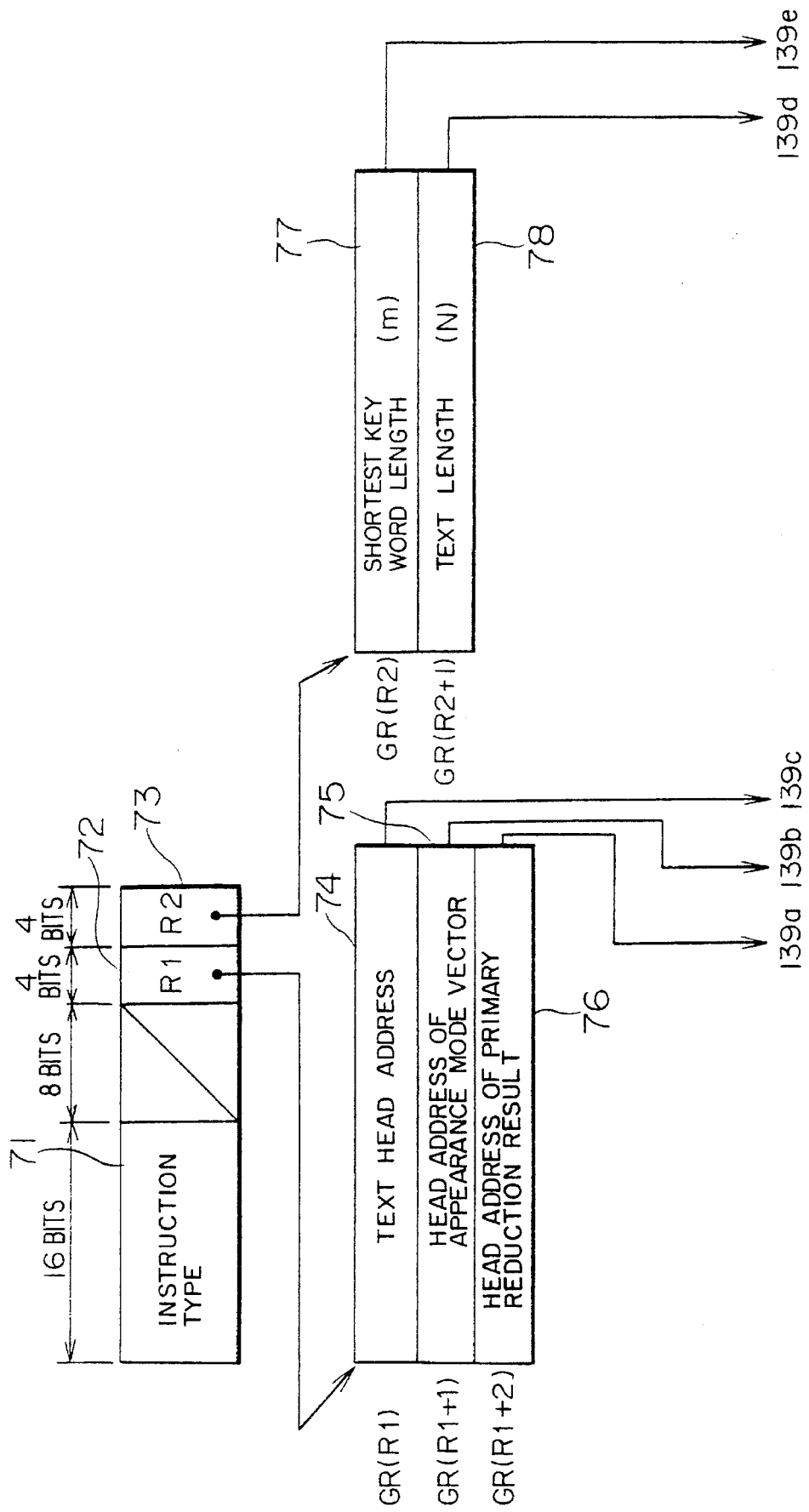
FIG. 7 is a diagram showing a form of a text search instruction used in the embodiment of FIG. 1, FIGS. 8A–8E are truth tables for the operation of counter control logic circuits 211 to 214 and a store control logic circuit 215 in the embodiment of FIG. 1.

FIG. 7 is a diagram showing the contents of a text search instruction. The instruction is comprised of 32 bits. The first 16 bits are a code 71 indicating the type of the instruction, the next 8 bits are ignored, and the subsequent 4-bit register number R1 designates three general-purpose registers 74, 75 and 76 numbered R1, Ri+i and R1+2 in the general-purpose register group (not shown) in the CPU 118. The last register number R2 having four bits designates two general-purpose registers 76 and 78 numbered R2 and R2+1 respectively. The general-purpose register 74 has stored therein the address of the leading character of the text vector 102 (text head address), the general-purpose register 75 a head address of the appearance mode vector 103, and the general-purpose register 76 a head address of the primary reduction result vector 104. The general-purpose register 77 has stored therein the above-mentioned shortest key word length (the value of the program variable m, which is 2 in the present embodiment) and the general-purpose register 78 the maximum element number N (17 in the present embodiment) of the text vector 102. The processing unit 118, upon detection of the text search instruction, sends the values of the general-purpose registers 74, 75, 76, 77 and 78 through signal lines 139c, 139b, 139a, 139e and 139d respectively to a vector element fetch circuit 152, a fetch circuit 154, a vector element store circuit 151 and a control logic circuit group 111 of the text search unit 117, which is thereby energized. After that, the processing unit 118 enters a ready state until the arrival of a completion report signal 140 from the text counter control logic circuit 211 in the control logic circuit group 111.

(5) Details of text search processing

The text search unit, upon energization thereof, resets the counters 112 to 115 and has the appearance mode vector 103 in the main memory unit 101 read entirely into the appearance mode vector storage RAM 109 by the fetch circuit 154. As the next step, the processing of the text vector 102 begins in the main memory unit 101.

Each element of the text vector 102 is fetched sequentially by the vector element fetch circuit 152, and the characters contained in the fetch data are sequentially set in the register 108. The text characters (two bytes) set in the register 108 are sent to the hash circuit 116 (which has a construction shown in FIG. 6) and hashed to a value consisting of ten bits. This hash value is sent to the RAM 109 as a read address, and an appearance mode corresponding to the text characters is read out and sent to the control logic circuit group 111 through the signal line 129. The control logic circuit group 111 includes counter control logic circuits 211 to 214 and a store control logic circuit 215. The counter control logic circuits 211 to 214 decide whether the text characters read out (the contents of the register 108) should be handled as a new candidate character string or should be added to the candidate character string being processed on the basis of the present values of the counters 112, 113, 114 and 115 and the appearance mode from the signal line 129. On the basis of the result of this decision, update instruction signals 156, 132, 134 and 136 to the respective counters are sent out. The store control logic circuit 215 detects the completion of a candidate character string on the basis of the values of the counters 112, 113, and 114 and the appearance mode 129, and sends a demand signal 122 to the vector element store circuit 151 so that the number of the leading element of the candidate character string detected and stored in the register 110 and the length of the particular character string may be sent as a pair to the vector element store circuit 151. The pair data set in the register 110 is sent to the vector element store circuit 151 through the signal line 150. The vector element store circuit 151 sends the data received thereby to the main memory unit 101 through the signal line 121, and the data is stored at a position designated by the result counter 115 in the primary reduction result vector 104.

The text counter control logic circuit 211, the coincident length counter control logic circuit 212, the effective length counter control logic circuit 213, the result counter control logic circuit 214 and the store control logic circuit 215 shown in FIG. 1 are a combination circuit for performing the operation indicated by the truth tables 211A, 212A, 213A, 214A and 215A respectively shown in FIGS. 8A to 8E. Details of each circuit, which are self-explanatory from the truth tables, will not be shown by reason of simplification. In the above-mentioned truth tables, by way of explanation, the present value of the text counter 112 is designated as i, the present value of the coincident length counter as l, the present value of the effective length counter 114 as v, the present value of the result counter 115 as k, the 0th to 3rd bits of the appearance mode vector 103 read out as $a_0$ to $a_3$, the shortest key word length as m, and the maximum element number of the text vector 102 as N. Also, of the input states, $N>i$, $l=0$, $l<m \wedge \bar{a}_0$ and $V<m$ represent input conditions to these circuits, and "1" and "0" in these truth tables indicate that these conditions are established or not. "x" indicates that these conditions are ignored, $\wedge$ a logic product, and $\bar{a}_0$ the negation of $a_0$.

Of the output signals, +1, NOP, "set 0" and "set 1" respectively represent that the counter value be increased by one, not to be changed, set to 0 and set to 1. The input condition $N>i$ is a condition satisfied before the element number i of the character being processed becomes N for the last element, that is, as long as the character being processed is other than the last one of the text vector 102.

$l=0$ is a condition established when the character preceding to the one being processed is not determined to belong to the candidate character string.

$l<m \wedge \bar{a}_0$ is a condition established only when the result of the processing preceding to the character being processed is $l<m$ (that is, when a character belonging to the candidate character string is not detected, or detected but the length l thereof is shorter than the shortest key word length m) and when $a_0$ for the character being processed is 0 (that is, when the character being processed is absent in any of the key words or present at a position larger than the shortest key word length) at the same time.

The condition v<m is established only when the length v of an effective candidate character string already detected is smaller than the shortest key word length m.

As seen from FIG. 8A, the text counter control logic 211 increments the text counter 112 by +1 as long as the character being processed is not the last one of the text vector 102. As a result, the content i of the text counter 112 indicates the element number for the next character each time an appearance mode is read from the RAM 109.

Now, the operation of each of the control logic circuits 211 to 215 and the counters 112 to 115 for searching for a candidate character string from the specific text vector 102 shown in FIG. 2 will be explained more in detail.

FIG. 9 shows a change in signal or each counter at different times when the appearance mode for each character of the text vector 102 is read sequentially from the time point 0. The first character itself is of course read from the main memory unit 101 two cycles before the time point 0.

Time Point 0

First, at time point 0, the counters 112 to 115 are all initialized at 0.

At time point 1, the operation based on the appearance mode for the first character "GYO" (行) is started.

The appearance mode for this character "GYO" (行) is "0000" and therefore it is not a character appearing in this key word. As a result, at time point 1, as shown in the line of time 1 in FIG. 9, only the value i of the text counter 112 is updated to the element number 1 for the next character, but not the other counts l, v and k.

This counter operation is determined in the manner mentioned below.

Time Point 1

The input conditions of the control logics 211 to 215 at the time point 1 are as follows: (1) N=17 and i=0, and therefore the condition N>i holds ("1"), (2) The condition l also holds ("1"), (3) The condition v<m also holds since v=0 and m=2 ("1"), (4) The condition l<m $\wedge \bar{a}_0$ holds since l=0<m=2 and $\bar{a}_0$=1 ("1"), and (5) $a_1 a_2 a_3$ is "000".

As a consequence, the text counter control logic 211 issues an operation instruction corresponding to the item number 2 of the truth table 211A, the coincident length counter control logic 212 the one corresponding to the item number 1 of the truth table 212A, the effective length counter control logic 213 the one corresponding to the item number 1 of the truth table 213A, the result counter control logic 214 the item number 1 of the truth table 214A, and the store logic 215 the one corresponding to the item number 1 of the truth table 215A. Specifically, the operation instruction represents i being updated by +1, l, v, the store signal 122 and the completion report signal 140 set to "0" and k left without being updated Thus, as a result of the processing of the text character "GYO" (行) at time point 1, a+1 update instruction is issued to the text counter i through the signal line 156, and a 0 reset signal to the coincident length counter l and the effective length counter v through the signal lines 132 and 134 respectively. The values i, l, v and k of the respective counters become 1, 0, 0 and 0 respectively as shown at the time point 1 in FIG. 9.

Time Point 2

At time point 2, the counter operation is performed based on the appearance mode of the next character "RETSU" (列). The character "RETSU" (列) has an apperance mode of "1001". "RETSU" (列) is a character appearing in a key word, but indicates that it is a character appearing at the end of a key word as shown by the appearance mode "1001" thereof. Since the length l is now 0, even if a character in a key word appears, it is not a character contained in a character string coincident with a key word unless it is a leading character of the key word. As a result, "RETSU" (列) is not considered a character belonging to a candidate character string. As shown in the line of time point 2 in FIG. 9, therefore, the counter values l, v and k are left at 0, and only the counted i is incremented to 2.

In this way, according to the present embodiment, the appearance mode holds the information indicating appearing the position of appearance for a character in a key word, and has the feature that even a character appearing in a key word is not handled as one belonging to a candidate character string when it does not appear in the same character string as a key word. By doing so, a wasteful candidate character string is saved.

By the way, the above-mentioned counter operation at time point 2 is determined according to the truth tables in FIGS. 8A–8E in the manner described below.

The input conditions at time point 2 are as follows: The conditions N>i, l=0 and v<m hold at time point 1, but the condition l<m $\wedge \bar{a}_0$ does not as $a_0$=1 ("0"). $a_1 a_2 a_3$ is "001". As a result, in accordance with the item numbers 2, 3, 4, 2 and 2 of the truth tables 211A, 212A, 213A, 214A and 215A respectively, only the counter i is incremented by +1, such the counter values i, l, v and k become 2, 0, 0 and 0 respectively.

Time Point 3

At time point 3, the counting operation based on the appearance mode map "1100" of the character "KEI" (刑) is performed.

At this time point, no candidate character string is detected (l=0), and "KEI" (刑) may be the head of a candidate character string as it is a character appearing at the head of a key word ($a_1$=1). The value l of the coincident length counter is incremented by +1 to 1 to store that some candidate character string has begun to be detected. By the way, the count value i is also incremented to 3, although v and k are left at 0.

In the process, the control of the counter operation is determined in the manner mentioned below in accordance with the input conditions. The input conditions N>i, l=0, v<m and l<m $\wedge \bar{a}_0$ are the same as for the character "RETSU" (列) at time point 2, while $a_1 a_2 a_3$ is 100. Thus, the operations of the item numbers 4, 2, 2 and 2 are performed for the truth tables 212A, 213A, 214A and 215A. As a consequence, the count value l is incremented by +1 but v remains unchanged.

In this way, the count values i, l and v are 3, 1 and 0 respectively at time point 3.

Time Point 4

At time point 4, the counting operation for the appearance mode "1010" of the character "SAN" (三) performed. This character may be present in the middle of a key word, $a_2$ being equal to 1. A candidate character string was under detection (l=1) at time point 3, and therefore the character "SAN" (算) appearing in the middle of a key word is added to the candidate character string. Thus only i and l are incremented by +1 as at time point 3.

In this way, the count values i, l, v and k become 4, 2, 0 and 0 respectively. The candidate character string in the form of "KEISAN" (計算) has thus been detected. The control of this counter operation is determined in the manner mentioned below.

At time point 4, the input conditions N>i and v<m hold as at time point 3, but not the conditions l<m $\wedge \bar{a}_0$ and l=0.

On the other hand, $a_1 a_2 a_3$ is 010. The control is effected as mentioned above in accordance with the item numbers of the truth tables 212A, 213A, 214A and 215A.

Time Point 5

At time point 5, the counting operation is performed for the appearance mode "0001" of the character "Hou" (法).

The character "HOU" (法) appears at the end of a key word ($a_3$=1), and therefore a candidate character string under detection, to which the character "HOU" (法) is added, should be completed as a candidate ("KEISAN HOU" (計算法) in the case under consideration). In this way, if a character appearing at the end of a key word is processed while a candidate character string is under detection (l≠0), a value obtained by adding 1 to the length l of the candidate character string thus far detected is used as a value v. Also, under this condition, l is reset to 0.

The count values i, l, v and k are thus rendered 5030.

The aforementioned counting operation is determined in the manner described below. At time point 5, the input conditions N>i and v<m hold, while the conditions l<m $\wedge \bar{a}_0$ and l=0 do not, as at time point 4. $a_1 a_2 a_3$ is, however, 001.

As a consequence, the counting operation is controlled in the manner described above by the item numbers 2, 7, 6 and 6 in the truth tables 212A, 213A, 214A and 215A.

Time Point 6

At time point 6, the counting operation is performed for the appearance mode "0000" of the character "O" (を). In view of the fact that a candidate character string having an effective length v (=3) more than the shortest key word length m (=2) already at time point 5 and that the present character is not included in the key words ($a_1$=$a_2$=$a_3$=0), the information on a candidate character string ("KEISAN HOU") (計算法) already detected is stored in the main memory unit 101 as a first element of the primary reduction result vector 104. For this purpose, the store signal 122 is set to "1" by the store control logic 215, and the result counter value k to "1", l and v are set to 0. The stored data thus make up a pair including the element number 2 of the leading character ("KEI") (計) of this candidate character string and the length 3 of this candidate character string.

The above-mentioned control is determined in the manner mentioned below. At this time point 6, the input conditions N>i, l=0 and l<m $\wedge \bar{a}_0$ hold, while the condition v<m does not, and $a_1 a_2 a_3$ remain 000. As a result, the aforementioned operation is executed by the item numbers 1, 1, 8 and 8 of the truth tables 212A, 213A, 214A and 215A respectively.

Now, the above-mentioned stored data is set to the register 110 at time point 6. Specifically, in parallel to the counter operation at each of the time points described above, the difference between the text count value i before being updated at the particular time point and the coincident length l is calculated by a subtracter 141, which difference is set in the register 110 through a signal line 125 after being held for a time unit by the register 147.

One of the values set to the register 110 is, therefore, i–l as of two time units before. At a point two time units before production of the store signal 122, as seen also from FIG. 9, l indicates a coincident length for the last character but one in the candidate character string under detection, and i the element number for the particular character. Thus, the difference i–l makes up an element number of the leading element of the particular candidate character string. On the other hand, the effective length v as of one time unit before is set in the remainder of the register 110, which is equal to the length of this candidate character length.

In the case under consideration, the register 110 stores at the first half four bytes thereof the difference (=2) between the text counter value i (=4) two time units before the present time point and the associated coincident length l (=2), and the last half four bytes thereof the value v (=3) of the effective length counter 114 at the time point 5 one time unit before the present time point. In this way, the 0th element of the primary reduction result vector 104 becomes (2, 3). The vector element store circuit 151 calculates a main memory address for storing the elements of the primary reduction result vector 104 indicated by the result counter value k, from the head address of the result vector 104 indicated by the signal line 139a and the result counter value k indicated by the signal line 136, and the data indicated by the signal line 150 is stored in the particular address through the signal line 121.

Subsequently, in similar fashion, in synchronism with the progress of time, the detection of the other candidate character strings "HEI RETSU" (並列) and "KEISAN KI" (計算機) proceeds as shown in FIG. 9, so that the counter values i, l, v and k become 18, 0, 4 and 3 respectively at time point 18. Under this condition, the data (14, 4) designating the last candidate character string "SEIGYO HOUHOU" (制御方法) is stored as a third element of the primary reduction result vector 104, and a completion report signal 140 turns to "1", so that the completion of operation of the text search unit is transmitted to the CPU 118.

The 0th bit $a_0$ of the appearance mode has thus far indicated whether the particular character appears before the shortest key word length m in the key word. Since this bit is used, a character string "SEI HOU" (制法) which may appear in the text vector, for instance, is capable of being removed from the candidacy This is by reason of the fact that "HOU" (法) appears at a position (third position) behind the shortest key word length 2, and therefore it is seen that it is impossible for "HOU" (法) to appear in the stage of detection of "SEI" (制) as a candidate character string. In this way, the appearance mode according to the present embodiment is designed to detect only a candidate character string as near to the key word as possible as a candidate character string with a minimum number of bits.

The processing unit 118, having received the completion report signal 140, completes the text search instruction processing, thus completing the primary reduction processing routine 31 (FIG. 3).

(C) Secondary reduction processing

As the next step, the text search program 106 calls a secondary reduction processing routine 32.

Figure 11:
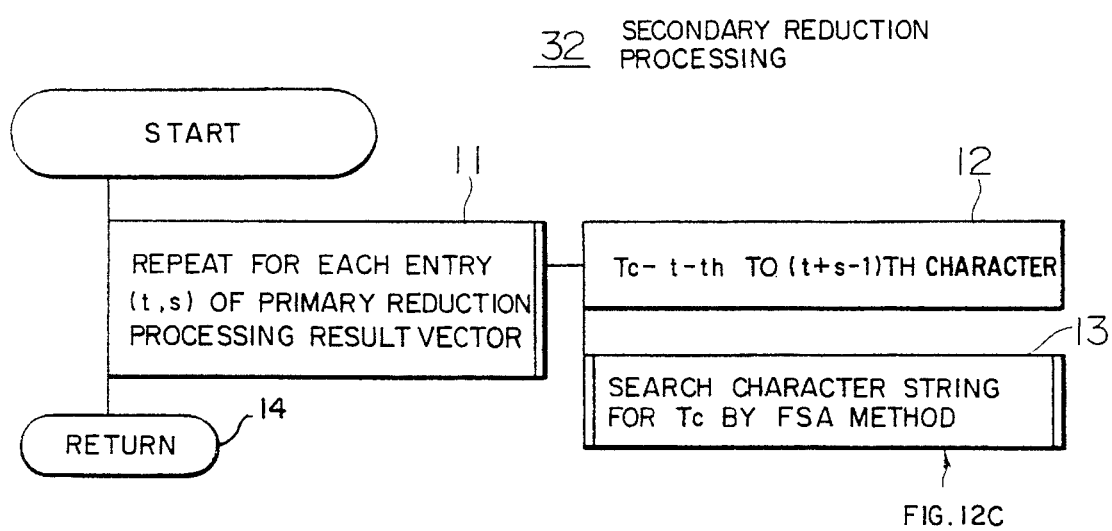
FIG. 11 is a flowchart for an embodiment of the secondary reduction processing 32 in the character search method according to the present invention.

FIG. 11 is a flowchart showing a configuration of the processing routine 32. In the secondary reduction processing routine 32, with regard to each element of the primary reduction processing result vector 104 (step 11), a candidate character string designated by each element is substituted into a program variable Tc (step 12), the key words 144 to 146 are handled as key words with Tc as a text character string to be searched for, a character string is searched for by a conventionally-known method such as the FSA method as employed in the present case (Refer to FIG. 12C) (step 13), such as "KEISAN HOU" (計算法) present in the primary reduction result vector 104 is removed, and the secondary reduction result vector 105 is prepared, followed by a return (step 14). The search for a character string by the FSA method is well known, and the operation thereof is described, for example, in the *Communications of the ACM* article cited above. Explanation will therefore be made only briefly.

Figure 12C:
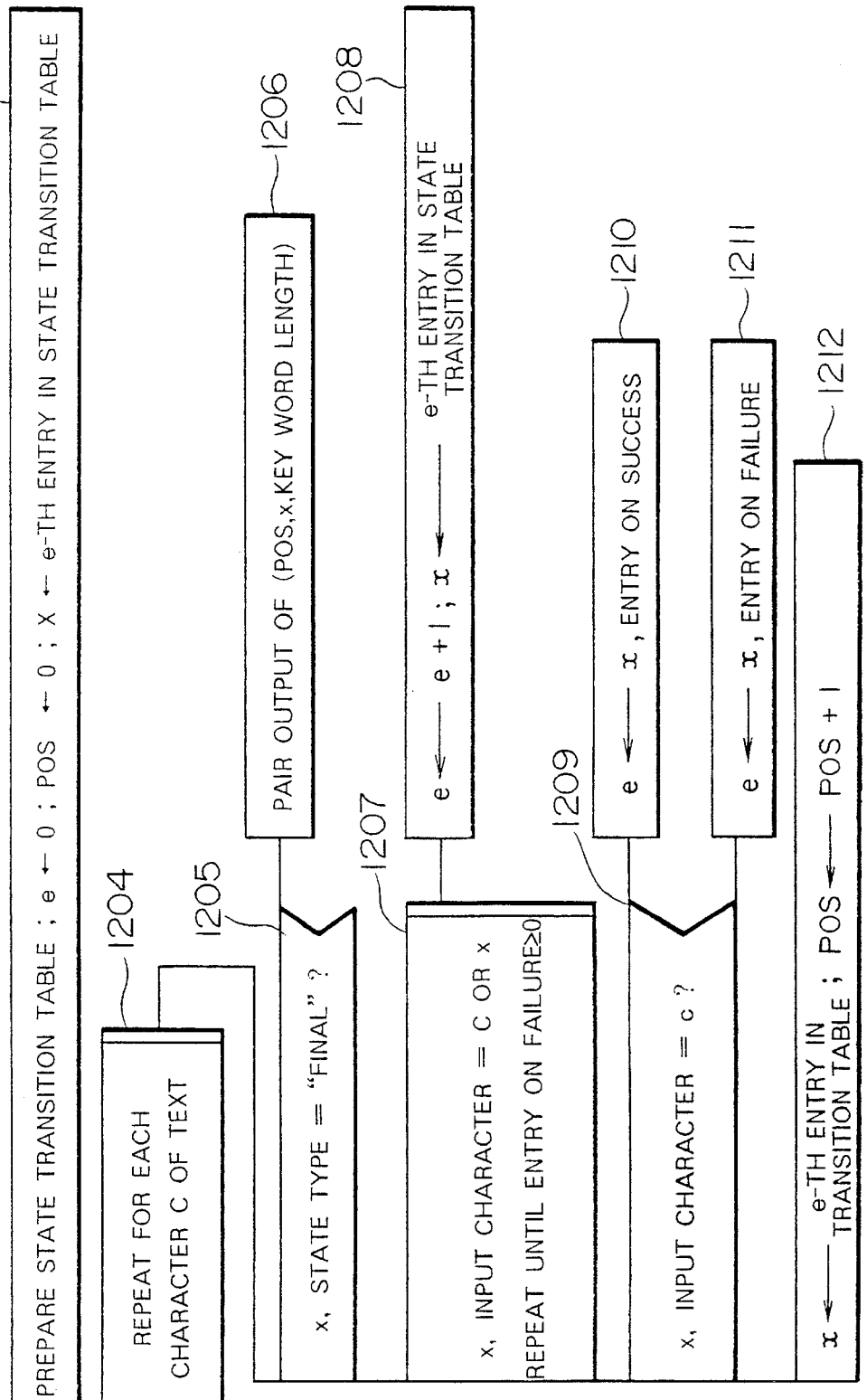

FIGS. 12A–12C are diagrams for explaining the FSA method known conventionally, and FIG. 12A is an example of state transition diagram for key words, representing the transition of character strings as a state (numerals surrounded by circles) in the case of the key words "HEI RETSU"(並列), "KEISAN KI" (計算機) and "SEIGYO HOUHOU" (制御方法). Assume that the initial state is "0". If the input character is "HEI" (並) the state "0" changes to "1"; if the character is "KEI" (計), the state changes to state "3"; and if the character is "SEI" (制), it changes to state "6". If the next character is "RETSU" (列) in state "1" the state changes to "2"), In the case where the input character is applied in the form absent in the key words or in an order different from the key word character string, the state is of course set to "0".

FIG. 12B is a state transition table which permits the state transition diagram of FIG. 12A to be applied to the signal processing.

In the FSA method, as shown in FIG. 12C, a state transition table is prepared as an initialization (1203), it is checked whether the present state is the final one (the last character input of a key word) (1205) each time a text character is applied (1204), and if it is the final state, the position of the text character and the key word length are produced (1206), a state transition table of FIG. 12B is checked from the present state and a text character thereby to determine the state to which transition is to be made at the next time (1207, 1208, 1209, 1210 and 1211), the state and the text position are updated (1212), and similar processings are repeated for the next text character until the end of the processing of the text characters.

In applying the above-mentioned well-known FSA method to the secondary reduction processing in the character string search method according to the present invention, leading characters of candidate character strings associated with the element number and the length of a candidate character string (number of characters: s) in the text vector 102, that is the element of the primary reduction result vector 104, is used as a program variable Tc, and the characters from $t$ to t+s−1 are sequentially applied. The processing of the character string search for each character is effected by carrying out the program steps 1205 to 1212 shown in FIG. 12C.

Upon completion of the secondary reduction processing routine 32, an intended final result or secondary reduction result vector 105 is obtained, thus completing the text search program 106 (step 33 in FIG. 3).

(D) Modification (1) Although the main memory unit 101 is used as a means of storing the text 102 according to the present embodiment, a magnetic disk unit or a magnetic tape unit may of course be used as an alternative since the text is read sequentially.

(2) Also, the character code may be one byte instead of two unlike in the present embodiment. In the case of a one byte code (such as the EBCDIC code, for instance), the amount of the candidate character strings detected in the primary reduction processing is increased, and therefore the load is liable to increase in the secondary reduction processing. This is by reason of the fact that there are only 26 English characters that can be expressed in one-byte codes, and therefore, with the increase in key words, most English characters undesirably appear in the key words (Kanji characters requiring two-byte codes appear in an amount less in key words as compared with the number of all the kanji characters even when the key words increase), so that many character strings in the text are liable to be determined as similar to the key words.

This problem is solved by handling a succession of two bytes as a single character in the case of a one-byte code character. As English word "parallel", for example, may be considered as a string including seven characters of "pa", "ar","ra", "al", "ll", "le" and "el", and may be processed exactly the same way as in the present embodiment, as explained later.

The hash circuit 116 in FIG. 1 is for compressing an input of two bytes to 10 bits. Compression to a smaller number of bits could reduce the capacity of the RAM 109. There would be a higher probability, however, of the results of hashing different characters leading to the same value (in what is generally called a "bump"), also resulting in an increased amount of noise in the primary reduction result 104.

(3) Although the appearance mode information according to the present embodiment has four bits, it may be simplified for circuit simplification. The 0th bit may be omitted, for instance (with the risk of increased noise, of course). Also, as a minimum configuration, there may be only one bit for indicating whether the particular character appears in a key word or not. In such a case, the effective length counter 114 is not required. In the control logic circuit group 111, on the other hand, arrangement should be made to increment the coincident length counter 113 by +1 each time successive characters in a key word appear, and with the appearance of a character not appearing in a key word, to produce a character string under detection as a candidate if the coincident length counter 113 is more than the shortest key word length m or not to produce any in the opposite case. As a result, the circuit would be simplified greatly, but the amount of noise would generally increase in this case, too.

Embodiment 2

Now, explanation will be made about a second embodiment for effecting the vectorial operation of a key word search method according to the present invention.

(A) Summary

The processing according to the present embodiment also includes the primary and secondary reductions. The vectorial operation is such that each of vector data, that is, each of elements arranged at regular intervals in a main memory unit, is processed the same way at high speed in pipeline fashion. Specifically, the processing is divided into a plurality of stages, and each element is processed sequentially through the stages. In the process, while a given element is going through a given stage, the next element is subjected to an immediately preceding stage of operation in parallel. In this way, a plurality of elements are processed in parallel. This vectorial operation is executed by a normal vector computer (such as an S810 Array Processor System of Hitachi, Ltd.) (not shown) having the capabilities of the four fundamental rules of arithmetic operation and relocation instruction. Such a system comprises a plurality of vector registers, and vector data from a main memory unit is stored in an appropriate one of the vector registers, so that the particular vector data is subjected to vectorial computation or other operations. This system is further adapted to execute different processings on different vector data in parallel to realize a further improved operating speed. In the description that follows, an vector data having an element data related to each character of a character string in a text will be used. They may include, for example, some vector data having a character code of each character, the appearance information of each character or the position of each character in the character string as an element respectively.

Figure 13:
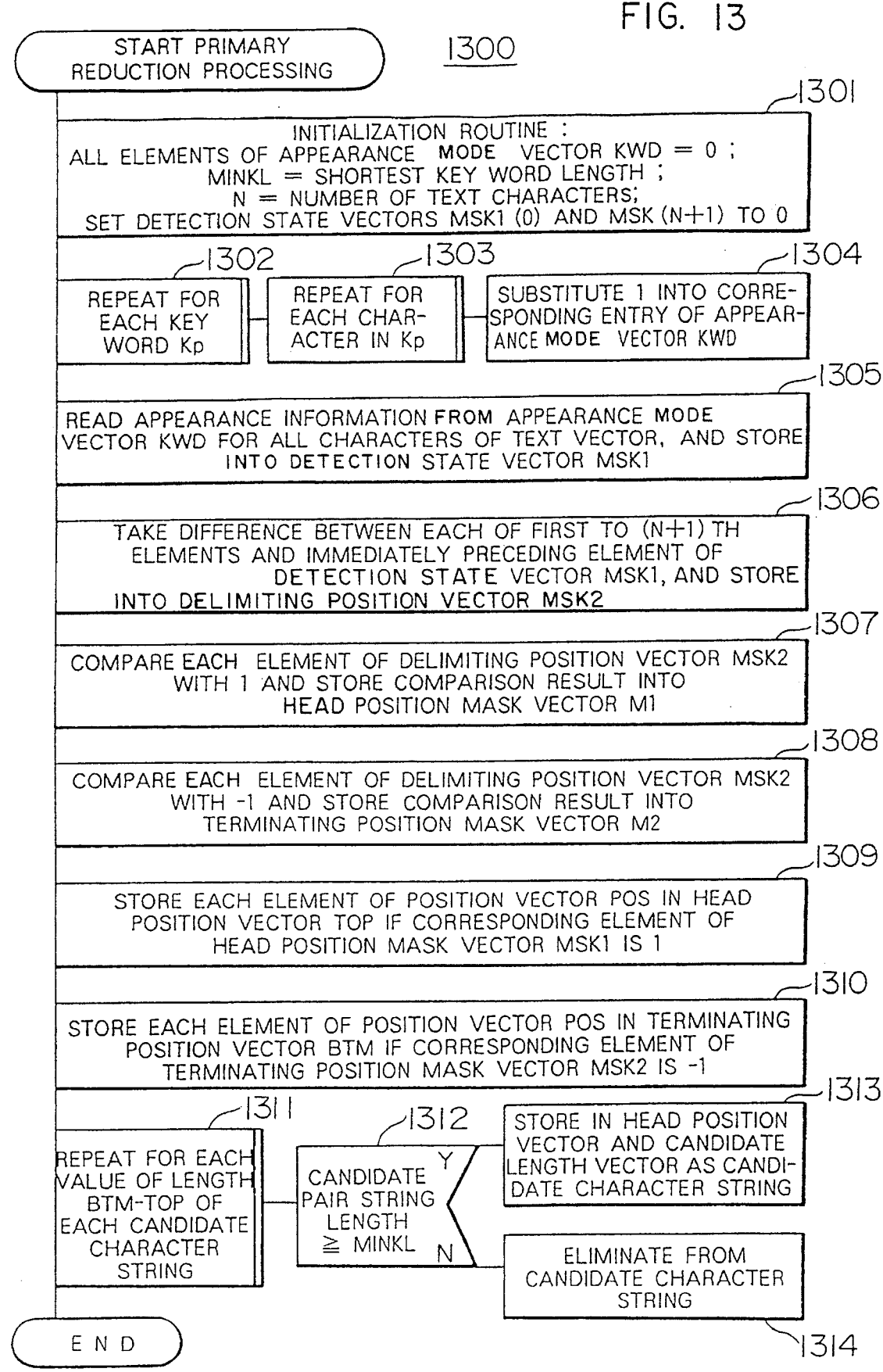
FIG. 13 is flowchart for the primary reduction processing in a second embodiment suitable for implementation by a general-purpose vector processor according to the present invention.
Figure 14:
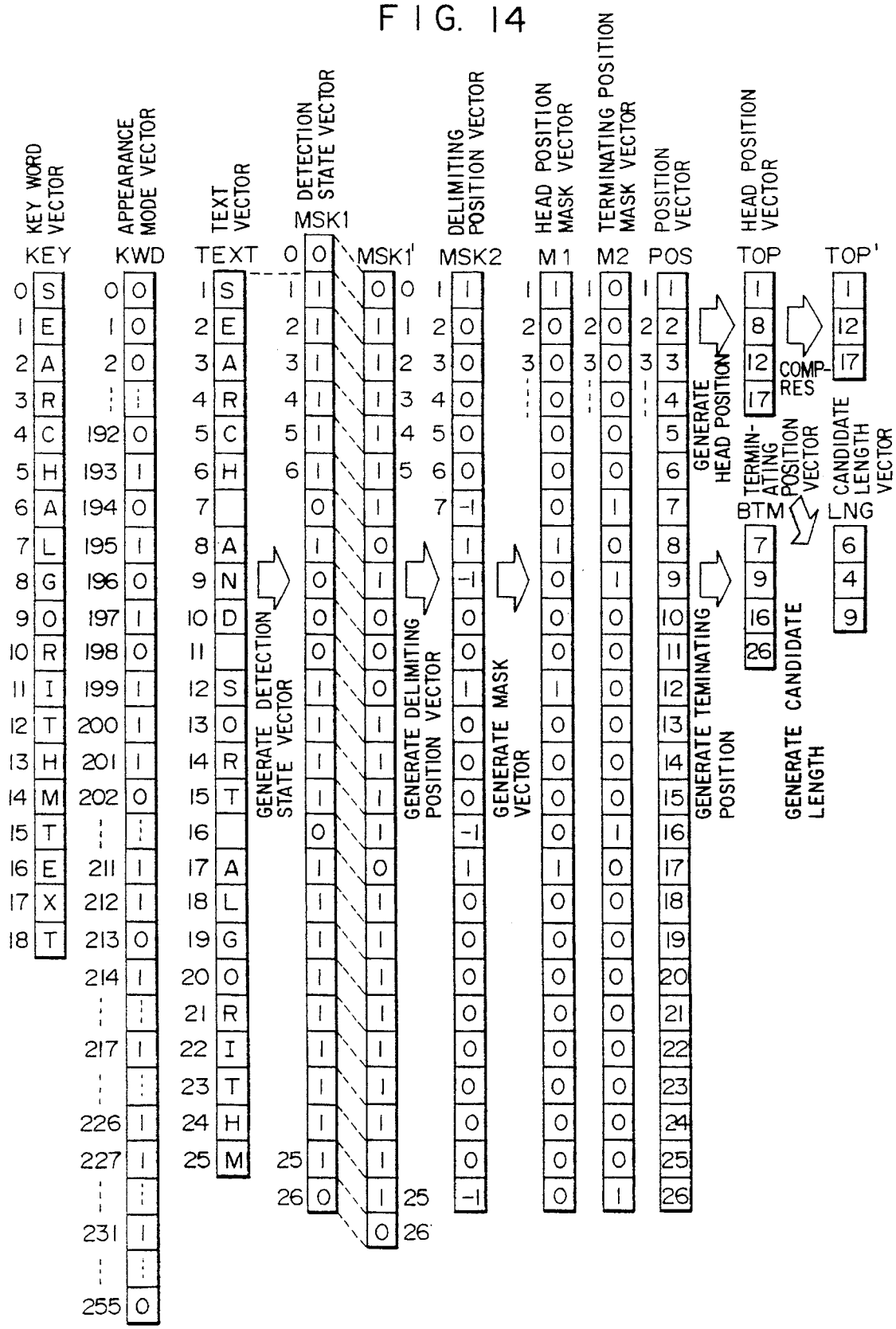
FIG. 14 is a diagram showing a change in vector data in the processing of FIG. 13.

FIG. 13 is a flowchart in PAD (Program Analysis Diagram) form showing a sequence of the primary reduction processing 1300 to search for a candidate character string according to the present embodiment. Explanation will be made while referring to FIG. 14 showing an example of the vector data to be processed as required. The vector data in FIG. 14 is held in either the main memory unit or a vector register. In the diagram, each longitudinal succession of squares represents a vector, each square indicating an element. The contents of each element designate a value in the example explained below, and the number attached to the left side thereof represents the element number (called the index). Explanation below will be made about a case using "SEARCH" "ALGORITHM" and "TEXT" as key words and "SEARCH AND SORT ALGORITHM" as a text.

In the diagram, the number of each element is assumed to start from 0 or 1 for facilitating the understanding. Instead, the element number may start from 0 for all vectors.

(B) Primary reduction processing (1) Summary

In the primary reduction processing, a key word vector KEY having a code of each character of a key word group in FIG. 14 as an element and a text vector TEXT having a character code for each symbol other than characters such as a blank and each character in the text as an element are used to find a partial character string (called a "candidate character string") likely to coincide with any of the key words by the vectorial processing from the text vector TEXT, thereby producing a candidate length vector LNG with the head position vector TOP having as an element the position (called the index) of the leading character of each partial character string in the text vector TEXT and also with the candidate length vector LNG having as an element the length of each candidate character string. The program for the processing and each of the vectors to be processed are stored in the main memory unit and are loaded in the vector registers as required to perform a vectorial or other operation.

In the case described below, a plurality of character strings including only a certain character in the key word vector KEY are detected as candidate character strings, and of these strings, those having a key word length less than the shortest key word length are removed to reduce the number of candidate character strings.

In the case of FIG. 14, first, the character strings "SEARCH", "A" (A of "AND"), "SORT" and "ALGO-RITHM" in the text vector TEXT are extracted as candidate character strings while eliminating the shortest candidate character string "A".

According to the present embodiment, as in Embodiment 1, the primary reduction is effected by vectorial processing. Since a normal vector computer lacking in a special search circuit like the one used in Embodiment 1 is used, however, the present embodiment is different from Embodiment 1 in that various vector processings are combined for the primary reduction by taking advantage of various vector instructions executable in this computer. The processings in this computer will be briefly described below.

First, it is decided whether each character in the text vector TEXT is included in the key word vector KEY. This decision may be made on each character independently of the other characters. Also, in order to effect this decision by vectorial processing, an appearance mode vector KWD indicating the particular character included in a key word is prepared in advance and used appropriately. The object and advantage of using this vector are the same as those in Embodiment 1. As a result of this decision, whether each character in the text vector is included in the key word vector KEY is indicated by a value "1" or "0" in a detection state vector MSK1 which is thus prepared. A string of values "1" in this detection state vector MSK1 indicates the character positions of a character string (candidate character string) which coincides with a given key word in the text vector TEXT. By using this detection state vector MSK1, the element number of the head character of each candidate character string is detected and is used as an element of the head position vector. In similar fashion, the element number of the last character of each candidate character string is detected and is used as an element of the terminating position vector BTM. As the next step, the length of each candidate character string is determined by use of these two vectors TOP and BTM, and candidate character strings smaller than the shortest key word length of the key word group are eliminated, thereby producing the head position vector TOP for the remaining candidate character strings and the candidate length vector LNG with the length of each candidate character string as an element. This is the result of the primary reduction.

According to this embodiment, each of the above-mentioned processings is executed vectorially by use of a vector processing instruction (pipeline processing). Further, some different ones of these processings are executed in parallel to each other. Specifically, as the result of the first vectorial processing for a first vector, a second vector is produced. In the process of effecting the second vectorial processing for the second vector, on the other hand, the second vector is subjected to the second vectorial processing after acquiring all the elements of the second vector, but once at least one of the elements of the second vector is produced, the second vectorial processing is started for the particular element. This technique is known as a "chaining" of the vectorial processing. Also, the operation of a third vectorial processing for a third vector totally different from the first and second vectors in parallel to the first and second vectorial processings is possible with some vector computers.

The embodiment under consideration has the feature in that the primary reduction processing is basically increased in speed by a parallel processing called the vectorial processing. According to the present embodiment, therefore, the speed of the primary reduction processing is improved by parallel execution of different vectorial processings as another feature thereof.

The increase in the speed of vectorial processing in the manner mentioned above is also applicable to the second reduction processing.

(2) Detailed processing

Now, the processings will be described in detail.

(2-1) Initialization routine 1301

Upon energization of a primary reduction processing routine, the initialization of the system is effected. Specifically, the length of the shortest one of the keywords (4 for "TEXT" that is the shortest key word in the case of FIG. 14) is substituted into the shortest key word length MINKL providing a program variable, all the entries of the appearance mode vector KWD are cleared to 0, and the length of the text vector TEXT (25 in the present case) is substituted into the text length N providing a program variable (step 1301).

These length data are obtained and recorded in registers (not shown) at the time of application of the text characters and key word characters.

Further, the 0th element MSK1(0) at the head of the detection state vector MSK1 and the (N+1)th element MSKi(N+1) thereof are set to zero. This is in relation to a step (1306) for identifying a candidate character string from the detection state vector MSK1, as described in detail later. Now, the initialization step is complete (step 1301).

(2-2) Registration of characters used for key words (steps 1302 to 1304)

In the next step, an appearance mode vector KWD indicating an identification of one of the alphanumeric characters included in the key word vector KEY is prepared. According to the present embodiment, each character is assumed to be represented by an 8-bit EBCDIC code. The appearance mode vector KWD includes as many elements as all the alphanumeric characters (total number (=256) of the characters represented by 8-bit codes in the present example). Each character has corresponding thereto an element of the same number as a code associated with the character. The value of such an element is 1 if the corresponding character is included in the key word vector KEY, and 0 if not. In this way, a character appearing in any of the key words is registered. Specifically, a character code Cq (meaning the code of the q-th character in a key word) in the key word vector KEY is sequentially fetched (step 1303) for each key word (step 1302), and 1 is substituted into an entry corresponding to the code Cq in the appearance mode vector KWD. This sequence will be studied with reference to a specific example in FIG. 14. With regard to the first character S of the first key word "SEARCH" of the key word vector, the character S has "$E2_{(16)}$" as a character code (EBCDIC code), or 226 in decimal notation. As a result, the element of the 226th entry of the appearance mode vector KWD is set to "1". This is also the case with the other key word characters, for which "1" is substituted into an entry corresponding to each character. As explained above, all the elements of the appearance mode vector KWD are initialized at the initialization step 1301, and therefore a corresponding information for a character not appearing in a key word remains "0". Also, according to this method, regardless of whether a given character appears at two points in the same key word or in different key words at the same time, the corresponding element in the appearance mode vector KEY remains "1" in value.

(2-3) Decision as to whether a character in text appears in key words (step 1305)

Upon completion of preparation of the appearance mode vector KWD at step 1302, a decision is made to determine a character registered in the appearance mode vector KWD and coinciding with each character in the text, thus generating a detection state vector MSK1. Specifically, each element TEXT(I) of the text vector TEXT is read out, a corresponding element in the appearance mode vector KWD is read out on the basis of the value (character code) of the element thus read (each element making up a one-character code of the text), and the element number I of the particular character (the element MSK1(I) corresponding to the element in the text vector TEXT) is stored in the detection state vector MSK1 (step 1305). This processing is the relocation of an element of the appearance mode vector to an element of the detection state vector based on an indirect address, and is realized by a vectorial processing using an instruction included in a normal vector computer. As a result of this processing, the I-th element of the detection state vector MSK1 comes to store therein the information as to whether the character of the I-th element in the text vector TEXT appears in the key word vector KEY ("1" if it so appears, and "0" if not in the present case), in the form vis-à-vis each element. In the case of FIG. 14, for instance, the character string "SEARCH" representing the first to sixth elements of the text vector TEXT has characters each included in the key word, and therefore the value stored in the first to sixth elements of the detection state vector MSK1 are "1". In similar fashion, it is detected that the 8th element "A", the 12th to 15th elements "SORT" and the 17th to 25th elements "ALGORITHM" of the text vector TEXT consist only of characters in the key word vector KEY. In the process, a character string not included in the key words such as "A" and "SORT" is also selected. By the way, MSK1 is provided with the 0th and (N+1)th elements not corresponding to the elements of the text vector TEXT for the reason of the processing mentioned later.

(2-4) Detection of candidate character string including only characters appearing in key words (steps 1306 to 1314)

In the steps that follow, this detection condition vector MSK1 is scanned, and a candidate character string is detected which is likely to coincide with any of the key words in which characters appearing in the key word vector KEY take a successive form (that is, those elements with value 1 of the detection state vector which appear in succession), thereby producing a result vector (TOP, LNG) with a pair of the number TOP and the length LNG of the head element thereof as an element. In the case under consideration described below, in order to reduce the number of candidate character strings, those detected candidate character strings having a length smaller than the shortest key word length (4 in the case under consideration) are excluded from the candidacy. This operation will be explained more in detail below.

(2-4-1) Detection of delimitation of candidate character string (step 1306)

First, those elements of the detection state vector MSK1 which have a different value from adjacent elements are detected. Specifically, the difference between each element MSKi(I) (I: element number) of the detection state vector MSK1 and an immediately preceding element MSKI(I−1) is detected, and this value is stored in the I-th element MSK2(I) of the delimiting position vector MSK2. This processing is realized vectorially by use of a normal vector instruction for taking a difference between the detection state vector MSK1 and the vector MSK1' (FIG. 14) with the element MSKi(I−1) as the I-th element thereof. Also, in the initialization step (1301), the values of the 0th and (N+1)th elements of the detection state vector MSK1 are assumed to be zero in order to provide for the step 1306. As explained above, the elements of the detection state vector MSK1 and the delimiting position vector MSK2 are processed apparently vis-à-vis each other. In the case where a succession of elements have a single value in the detection state vector MSK1, the values of the elements MSK2(I) of the delimiting position vector MSK2 corresponding to the leading element MSKI(I) (I: element number) of the string of successive elements are 1. In similar fashion, the element MSK2(J+1) immediately following the element MSK2 (J) of the delimiting position vector MSK2 corresponding to the final element MSKi(J) (J: element number) in a string of successive elements is −1. In the case of FIG. 14, the number of the stored element of the leading character "S" in the word "SEARCH" of the text vector TEXT is 1, while the first element of the delimiting position vector MSK2 takes a value of 1. Also, the number of the (6+1)th element of the delimiting position vector MSK2 is −1. After all, in the case of FIG. 14, the delimiting position vector MSK2 indicates that the first, eighth and 12th elements of the text vector TEXT lead the four candidate character strings (SEARCH, A, SORT and ALGORITHM) and that the 6th, 8th and 25th elements come at the end of the four candidate character strings.

(2-4-2) Detection of positions of leading and terminating elements of candidate character string (steps 1307 to 1310)

As seen from above, the position of an element whose value in the delimiting position vector MSK2 is not zero is related to the position of the leading and terminating elements of a string having a succession of elements of value 1 appearing in the detection state vector MSK1. Also, as explained above, the elements of the detection state vector and those of the text vector TEXT apparently correspond vis-à-vis to each other. If the value of each element MSK2(I) of the delimiting position vector MSK2 is 1, therefore, the I-th element of the text vector TEXT corresponding thereto provides the leading element of a candidate character string. By taking advantage of this fact, the element number I indicating the position of the leading element of the candidate character string is stored in the main memory unit as an element of the head position vector TOP by the processings of steps 1307 and 1309.

In the next process, if the value of the I-th element of the delimiting position vector MSK2 is −1, the (I-1)th element of the text vector TEXT is the final element of the candidate character string. Making use of this fact, steps 1308 and 1310 described later are executed to store the element number I indicating the position of an element immediately following the final element of the candidate character string in the main memory unit as an element of the terminating position vector BTM.

In the case of FIG. 14, for example, the first element of the delimiting position vector MSK2 is 1, and therefore "1" is stored in the first element of the head position vector TOP, while since the 7th element of the delimiting position vector MSK2 is −1, on the other hand, "7" is stored in the first element of the terminating position vector BTM. In the case of FIG. 14, as a result of this, the head position vector TOP indicates that the first element (S), eighth element (A), 12th element (S) and 17th element of the test vector TEXT represent the numbers of the leading elements of the four candidate character strings (SEARCH, A, SORT and ALGORITHM) respectively. In similar fashion, the terminating position vector BTM indicates that the sixth, eighth, 15th and 25th elements of the text vector TEXT represent the numbers of the trailing elements of the four candidate character strings.

Actual vectorial processings executed with regard to this will be explained with reference to steps 1307 and 1309. The detection state vector MSK1 is compared with a scalar value 1 in compliance with a vector comparison instruction thereby to produce a head position mask vector M1 (step 1307). The head position mask vector M1 has stored therein "1" at a position corresponding to the element having a value 1 in the detection state vector MSK1. Then, by use of the head position mask vector M1, the elements of the position vector POS whose mask value is 1 are stored in the head position vector TOP (step 1309). This step also may be realized by a normal vector instruction for relocation of vector elements based on an indirect address. Steps 1308 and 1310 are also executable by a normal vector instruction.

As a result of the foregoing steps, the element number of the leading character of each candidate character string in the text vector TEXT is stored in the head position vector TOP, and the element number following the last one in the particular character string in the terminating position vector BTM. This step of detecting the head and terminating positions of a candidate character string is for detecting a specific element value (specifically, "1" or "−1") by searching the delimiting position vector MSK2, and a plurality of such steps are executed in parallel for respective elements by independent vector instructions. Also, in processing the vector instruction for generating a delimiting vector MSK2 from a detection state vector MSK1 (step 1306), the steps 1307, 1308, 1309 and 1310 providing succeeding vector instructions may be executed each time of generation of an element value of the delimiting position vector MSK2. As a result, it is possible to overlap the vector instruction string for step 1306 with that for steps 1307 to 1310 (chaining), thereby realizing a high-speed processing.

(2-4-3) Elimination of candidate character strings less than shortest key word length (steps 1311 to 1314)

Of the candidate character strings obtained by the foregoing steps, those character strings less than the shortest key word length MINKL (4 in the present case) are eliminated from the candidacy. First, each element of the terminating position vector BTM and the corresponding element of the head position vector TOP are subtracted one from the other (step 1311, which is executable by a normal vector instruction). When the resulting difference takes a value more than the shortest key word length MINKL (step 1312), it is applied to the candidate length vector LNG as a candidate character string length and at the same time the head position of the corresponding candidate character string to the head position vector TOP' (step 1313). Also, if the difference between the element of the terminating position vector BTM and that of the head position vector TOP is smaller than the shortest key word length MINKL, on the other hand, a corresponding candidate character string is not applied as it is apparently not coincident with the key word (step 1314). Consequently, in the case of FIG. 14, for example, the head element numbers 1, 12 and 17 for the words "SEARCH", "SORT", and "ALGORITHM" in the text vector TEXT are held in the vector TOP', with the lengths 6, 4 and 9 of the respective candidate character strings held in the candidate length vector LNG. With regard to the character string "A" on the text vector TEXT designated by the second elements of the terminating position vector BTM and the head position vector TOP, however, the length thereof is 1 and smaller than the shortest key length MINKL (=4), and therefore the value of the element number indicating this character string is not applied to the head position vector TOP' or the candidate length vector LNG. In this way, the provision of the shortest continuous length MINKL for checking makes possible detection of a character string nearest to a key word as a candidate character string. The primary reduction processing is thus finished.

25

(C) Secondary reduction processing (1) Summary

Also according to the present embodiment, the secondary reduction processing is executed after the primary reduction processing. In the present embodiment, however, in order to increase the processing speed as compared with Embodiment 1, the conventionally-known FSA method is executed vectorially. Generally, an application of the vectorial processing requires the conditions described below to be satisfied.

First, it is necessary that each element in the same vector be processable independently of the other elements. Specifically, a given element must be processable before the result is obtained of the processing of the other elements.

It is possible to execute the FSA method in vectorial fashion in accordance with the procedure mentioned below, if a text character string is divided into a plurality of partial character strings in such a manner that a given key word included in the text character string is not dividedly contained in different partial character strings and a given character in the text character string is not contained in two or more different partial character strings at the same time. Each candidate character string obtained as a result of the primary reduction processing according to the first embodiment described above satisfies this condition of division.

More specifically, in a first input vector having the head element of these partial character strings as an element and a second input vector having a second element of the partial character strings as an element, the state of the destination of transition for an element in each vector may be determined independently of the other elements in the same vector. As a result, these input vectors meet the above-mentioned conditions. It is thus possible to discriminate the state of a destination of transition vectorially by the FSA method.

This processing will be briefly described below.

First, a state transition destination vector FSATBL (FIG. 17A) providing data in vector form corresponding to a state transition table is prepared from key words. In the process, when a given character is applied as an input with each partial character string in a given state, the number of the state to which the particular partial string is destined for is stored at a position determined by a combination of the state of the particular destination and the particular input character. Then, a state vector STATE is prepared with the number of the state of each partial character string (candidate character string) as an element. In the next step, an input character vector including the first character of each partial character string (candidate character string) is generated. On the basis of these three vectors, the process for determining a destination of state transition of each partial character string with a character applied to the partial character string (candidate character string) is executed in vectorial fashion. Specifically, in accordance with the value of the element (state number) of the state vector STATE for each partial character string and a single character code of each partial character string, the state transition destination vector FSATBL is referenced to, and the number of the destination state read out is used to rewrite the state number for each partial character string in the state vector. In this way, the state transition processing for a character of each partial character string (candidate character string) is realized in vectorial fashion. After the state transition processing for a character, a second character of each partial character string (candidate character string) is used to prepare an input character vector and repeat the state transition processing. These processings are repeated until the arrival of the last character of a partial character string.

26

(2) Details of processing

Now, the secondary reduction processing 1501 according to the present embodiment will be explained in detail below in accordance with the flowchart in PAD form shown in FIG. 15, and also with reference to the vector data flow in FIG. 17B as required. The contents of the vector data in FIG. 17A correspond to the text character strings and the key word character strings shown in FIG. 14.

A detail of this operation will be described below.

(2-1) Delivery of parameters

Figure 15:
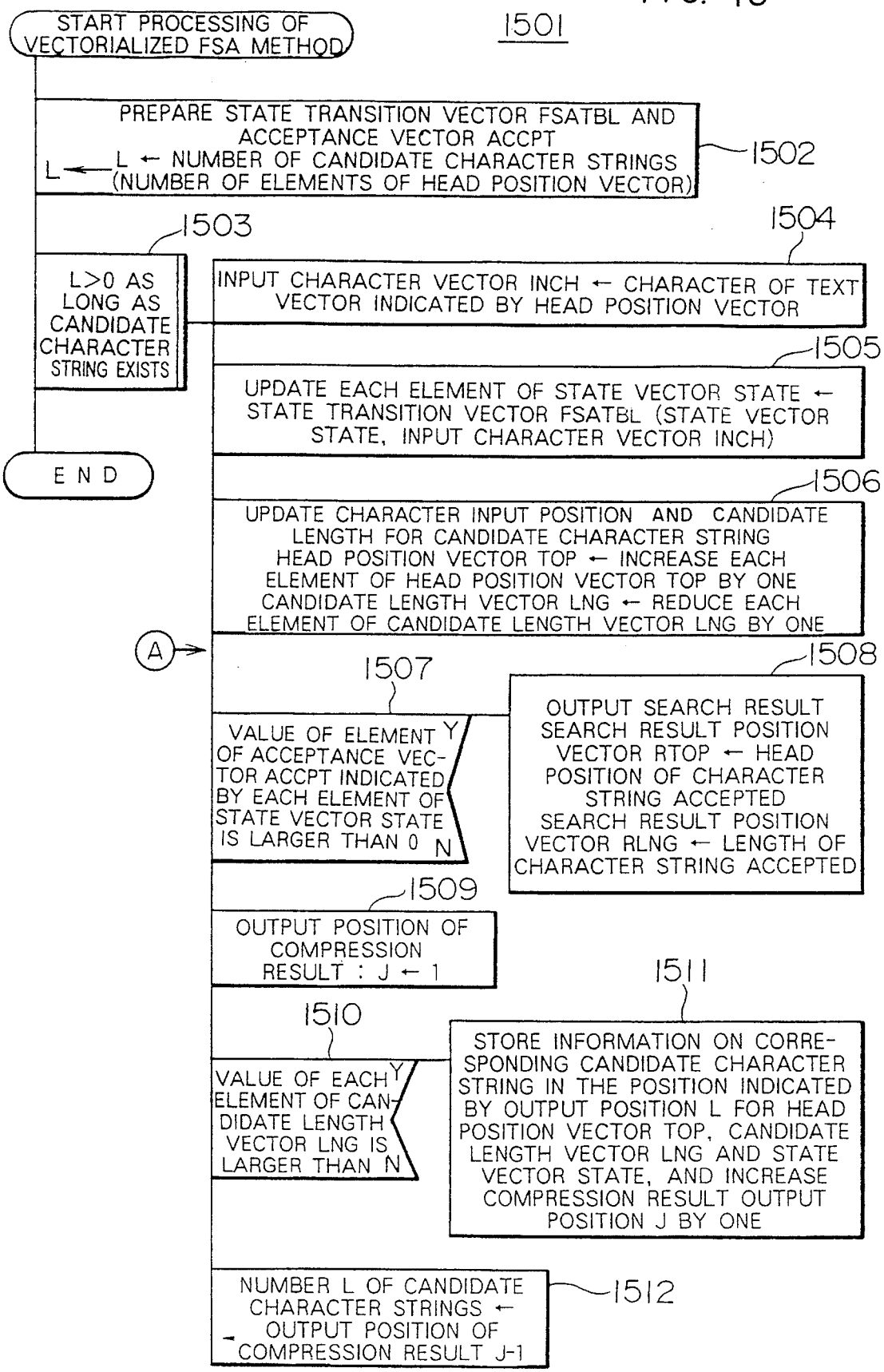
FIG. 15 is a flowchart for the secondary reduction processing for executing vectorial processing of the FSA method.

First, a vectarialized FSA method processing routine 1501 shown in FIG. 15 is called and started by a text search program (not shown). A plurality of parameters delivered from the calling side in starting the vectorialized FSA processing routine are shown in FIG. 17A. Specifically, the parameters so delivered include a key word vector KEY, a text vector TEXT, a head position vector TOP and a candidate vector LNG representing the position and length of a candidate character string respectively, and also a state vector STATE with a state number for each partial character string as an element. In the process, the two vectors TOP and LNG indicating a candidate character string are stored in the form of the head element number and character string length respectively for each of the three partial character strings "SEARCH", "SORT" and "ALGORITHM" providing the result of the primary reduction processing. Also, the initial value 0 is stored for each element of the state vector STATE.

Further, a search result position vector RTOP and a search result length vector RLNG are given as vectors for storing the position and length respectively of a character string (coincident with a key word) produced as a result of the secondary reduction processing. In FIG. 17A, the values for the final result based on the present embodiment are shown for the elements of the vectors RTOP and RLNG, although these values stand at 0 at the time of starting the processing routine 1501. The present embodiment is assumed to have a sufficient length to hold the result of processings other than these vectors, by way of simplification.

Of the parameters shown in FIG. 17A, the state transition vector FSATBL and the acceptance vector ACCPT are internal variables of the present routine 1501 and are not delivered as parameters.

(2-2) Generation of the state transition destination vector, acceptance vector and the like (step 1502)

The vectorialized FSA method processing routine (1501) having the above-mentioned parameters delivered thereto first effects initialization (step 1502). The state transition destination vector FSATBL and the acceptance vector ACCPT are generated from the key word vector KEY. Further, the vector length of the head position vector TOP is set to the program variable L. Specifically, the program variable L has set thereto the number (L=3 in the present embodiment) of candidate character strings (partial character strings) providing an object of reduction.

Figures 16A, 16B, 16C:
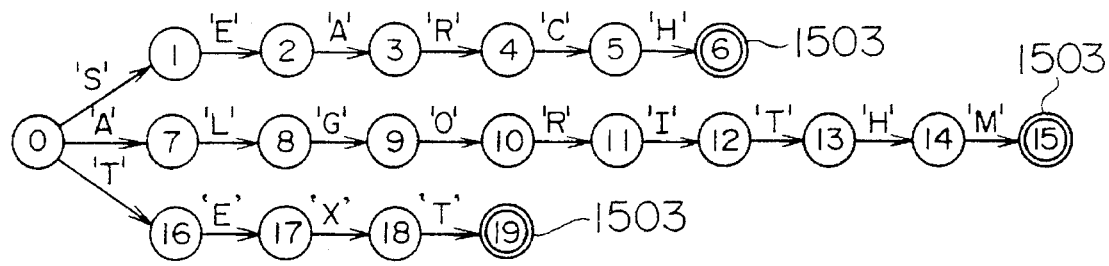
FIGS. 16A–16C are diagrams showing a state transition vector for a state transition diagram and an acceptance vector used in the processing of FIG. 15, FIGS. 17A–17B are diagrams showing a vector data for the processing of FIG. 15 and a change thereof.

FIGS. 16A–16C are diagrams is a diagram for explaining the above-mentioned state transition destination vector FSATABL and the acceptance vector ACCPT.

FIG. 16A is a state transition diagram provided with three key words including "SEARCH", "ALGORITHM" and "TEXT". FIGS. 16B and 16C are tables prepared on the basis of the state transition diagram 16A to represent the relationship between the state, input character and a destination of state transition. In these tables, the destination of state transition makes up vector data FSATBL. The state transition destination vector FSATBL is provided with as entries as these are settings of input character codes ($2^8$=256 varieties, since the input character codes are those of one byte in the present case) for each state as shown in FIG. 16B. As a result, the number of elements of the state transition destination vector FSATBL is equal to the number of states (20×256=5120 in the present case). If character codes are expressed as 8-bit binary integers, each of them corresponds to one of the entries for the same state in ascendant order. Each element of the vector FSATBL has stored therein the number of a transition destination with a corresponding character applied under a corresponding state. For example, the 193rd element (the EBCDIC code of "A" is C1 in hexadecimal notation and 193 in the decimal system) of the state transition destination vector FSATBL has stored therein the number 7 of the transition destination with the character "A" applied under the state 0. Also, the acceptance vector ACCPT in FIG. 16C is for checking to see whether a state is acceptable as a key word-detected state. Specifically, the acceptance vector ACCEPT is provided with entries associated with various states, and has stored therein the detected length of key word under an acceptable state and "0" under an unacceptable state. Referring to FIG. 16C, as an example, the value of the element of the acceptance vector ACCPT corresponding to the state 6 with the key word "SEARCH" detected is 6, indicating that a character string having six characters has been detected as a key word. In similar fashion, the values of the 15th and 19th elements are rendered equal to the lengths 9 and 6 of ALGORITHM and TEXT respectively.

(2-3) To determine the state of the destination of transition of a candidate character string from each character in the particular candidate character string Returning to FIG. 15, the steps of 1503 and on are repeated for each candidate character string for the purpose mentioned above.

(2-3-1) To determine the state after transition for the primary input for each candidate character string The first step is to prepare an input character vector INCH including the leading character of each of three candidate character strings in the text vector TEXT (step 1504). In the case under consideration, the vector INCH includes the leading characters S, S and A of the three candidate character strings. The processing is realized by a vector relocation instruction based on an indirect address. In the next step, each element of the resultant input character vector INCH and the corresponding element of the state vector STATE (both are zero in value in the case under consideration) are used to update the corresponding element of the state vector STATE (step 1505) by the number (1, 1 and 7 in the present case) of the destination state of each candidate character string with reference to the state transition destination vector FSATBL. This step is realizable by a normal vector instruction (relocation processing or the like based on the integration or summing computation or indirect address).

In the next step, in view of the fact that the state transition of one leading character is completed for each candidate character string by the steps 1504 and 1505, the value of each element of the head position vector TOP is incremented by one while decrementing the value of each element of the candidate length vector LNG by one (step 1506). Specifically, each element of the head position vector TOP indicates the element number (2, 13 and 18) in the text of the second character in the corresponding first, second and third candidate character strings. In similar fashion, each element of the candidate length vector LNG indicates the number of the remaining characters (5, 3 and 8 in the present case) of the corresponding candidate character strings subjected to search. In accordance with the above-mentioned example, FIG. 17B ① shows the values of the head position vector TOP, the input character vector INCH, the state vector STATE and the candidate length LNG at the time point of execution of the above-mentioned steps (the time point indicated by Ⓐ in FIG. 15). In this case, the value of the head position vector TOP is larger by 1 than the initial value, thereby indicating that the second character of each candidate character string becomes an object of transition processing (steps 1504 and 1505). Also, the input character vector INCH has stored therein the leading character of each candidate character string, and the state vector STATE the state number of each candidate character string after transition based on the input character vector INCH. When paying attention to the first candidate character string, it is seen that transition has been made to state 1 by application of the character "S" under state 0. As to the candidate length vector LNG, each element is stored in a value smaller by 1 than in the initial state because of the transition processing that has been made for one character.

(2-3-2) Decision as to whether each candidate character string has become acceptable (step 1507)

After completion of the state transition, each candidate character string is checked to see whether the new state after transition is acceptable or not. First, reference is had to the elements of the acceptance vector ACCPT indicated by the value of each element of the state vector STATE after transition. Then, it is decided whether each of the values referenced to is a positive number indicating the final state number (step 1507). If it is positive against any candidate character string, the particular character string is acceptable, and therefore the head position and length thereof are stored in the elements corresponding to the output vectors RTOP and RLNG respectively (step 1508). When the value of an element reference to in the acceptance vector ACCPT relating to a given candidate character string is zero, the particular character string is not acceptable, and therefore the process proceeds to the next step without doing anything. In the example shown in FIG. 17B ①, the states 1 and 7 providing each element of the state vector STATE are both unacceptable, and therefore no output of the result character string is produced.

(2-3-3) Elimination of unacceptable candidate character strings with the remaining length of zero (improper candidates) (steps 1509 to 1512)

A modification of the vector for the purpose of this elimination will be called "compression" in the description below. First, a program variable j indicating the position of producing a compression result is set to 1 (step 1509). In the next step, all the candidate character strings are checked for the value of the elements of a candidate length vector LNG providing the remaining length of each candidate character string (step 1510). If the length is larger than 0, the remaining portion of the candidate character string is required to be subjected to the state transition processing again (steps 1504 to 1506), so that the elements for the candidate character string are left unremoved from the head position vector TOP, the candidate length vector LNG and the state vector STATE (step 1511). If the length is 0, on the other hand, it indicates that the state transition processing has been executed for the final character of the related candidate character string, so that the elements representing the head position, candidate length and state number relating to the particular candidate character string are eliminated from the vectors TOP, LNG and STATE. Finally, the number of the remaining candidate character strings is set to the program variable N (step 1512). By referring to the example of FIG. 17B ①, each candidate character string has a value larger than 0 of the element of the candidate length vector indicating the length of the remaining portion, and therefore, the number of candidate character strings is not required.

As explained later, however, the candidate "SORT" obtained by the primary reduction processing is eliminated by this compression processing.

With regard to steps 1504 to 1511, the element of the vectors (head position vector TOP, candidate length vector LNG, input character vector INCH and state vector STATE) representing the characteristics of the respective candidate character strings are not related to each other. With regard to a vector instruction string making up these steps, therefore, in a vector producing a given vector instruction, it is possible to start computation of the next vector instruction with the former vector as an input at a time point when the element value is established. An execution, therefore, may be overlapped between vector instruction strings (in what is called the "chaining"), thereby attaining a high speed. In this way, the vectorialized FSA method according to this embodiment provides an algorithm suitable for a vector computer.

(2-3-4) Repetition of processes (2-3-1) to (2-3-3) for remaining characters of the remaining candidate character strings The processing for one character on each candidate character string is now over. Returning to step 1503, it is checked whether the variable N indicating the number of candidate character strings is larger than 0. If the value N is larger than 0, that is, as long as a candidate character string remains, the above-mentioned steps (1504 to 1512) are repeatedly executed. At the time point when the candidate character strings are exhausted, the processing (1501) of the vectorialized FSA method is completed.

(3) Example of processing

Finally, the compression of a candidate character string and an output of a result character string will be explained with reference to the example of FIG. 17B. In the loop of steps 1504 to 1512 of FIG. 15, the value of each vector at point Ⓐ is shown in FIG. 17B. At point ④ in FIG. 17B, the value of the second element of the candidate length vector LNG is zero, indicating that the search of the candidate character string "SORT" has been completed. In the processing of steps 1510 to 1511, therefore, the data relating to the candidate character string "SORT" are deleted so that the candidate length after point ⑤ in FIG. 17B becomes 2 (N=2). Also at point ⑥ in FIG. 17B, the value of the first element of the state vector STATE is 6. As to the state 6, the value of of the sixth element of the acceptance vector ACCPT (1502) is 6, indicating that the state is acceptable. Steps 1507 to 1508 thus recover an output (the position and number of head characters of the text character string of a key word) for the vectors RTOP and RLNG for result storage with regard to the candidate character string "SEARCH" as a candidate character string coincident with the key word.

As a consequence of the above-mentioned processings, the candidate character string "SORT" making up noise of all the candidate character strings "SEARCH", "SORT" and "ALGORITHM" which are the results of the primary and secondary reduction processings by the vectorialized FSA method is removed thereby to realize a complete search as a whole.

Upon completion of the secondary reduction processing routine 1501, the intended final result is obtained, and therefore the text search program (not shown) is completed.

(D) Modification

Although Embodiment 2 uses a character code of one byte as an object of primary reduction processing, it may alternatively be a 2-byte code. With regard to a 1-byte code text, if the primary reduction processing in Embodiment 2 is realized in two bytes in the same manner as if successive two bytes make up a code of one character, the amount of the candidate character strings detected in the primary reduction processing is reduced as compared with when detection is made in one-byte, thus decreasing the load of the secondary reduction processing.

This method of improvement will be explained briefly with reference to FIG. 18. Assume that the text and key word involved are represented by a one-type code (EBCDIC code) and that characters that appear are in 27 types in all including 26 letters and a blank for simplification. Further, entries of the appearance mode vector KWD(181) are limited to 729 (=27×27). As shown in FIG. 18, a key word has two successive two bytes thereof handled as a character and is so registered with the appearance mode vector KWD(181) unlike in the appearance mode vector KWD shown in FIG. 14. Suppose TEXT and SEARCH shown in FIG. 18A are used as key words, for example. Among them, the key word "TEXT" is handled as a string including four characters of "TE", "EX", "XT", and 1 is stored in the corresponding entry of the appearance mode vector KWD1. In the text character string, two, successive bytes are treated as one character. In the case of the text illustratively shown in FIG. 18, the text vector TEXT becomes like a vector 182 shown in FIG. 18. With regard to the algorithm for the primary reduction processing, only the unit of processing is different and exactly the same processings may be executed as in the aforementioned embodiments for the rest. According to the present method of improvement, the noise of "HASH" that appears in the candidate character string in the case of processing a byte as a character is removed. This is by reason of the fact that each of the characters in the set of "HA", "AS" and "SH" has a value of 0 in the appearance mode vector KWD(181). As a result, the amount of the candidate characters that is the result of the primary reduction processing decreases, thereby reducing the processing requirement of the secondary reduction processing for a higher speed as a whole.

Embodiment 3

Embodiments 1 and 2 are both executed by use of a computer capable of vectorial processing (pipeline processing).

The feature of the present invention, however, lies in that the processing for a character is carried out in parallel to that for another.

This effect, therefore, may be attained by a plurality of processors operable in parallel in the same way as a computer having a pipelining ability. Specifically, different elements of the vectors described in Embodiment 2 may be processed by different processors.

Embodiment 4

According to Embodiment 2, the processing is executed by the FSA method vectorially in the secondary reduction. This vectorial processing may be applied directly to a text without any primary reduction. The text is divided to satisfy the conditions of division described in the beginning of the section dealing with the secondary reduction processing in Embodiment 2.

In a simplest case, a delimiting symbol that cannot be a key word in the text may be used. In Japanese text, for example, it is a period or a comma, and in English, it is a blank.

Partial character strings thus obtained are subjected to vectorial processing for the secondary reduction as applied to the candidate characters in Embodiment 2.

In this method, the number of candidate character strings is increased compared to when the primary reduction processing is used. Since the FSA method may be carried out at high speed by vectorial processing, however, the processing speed is improved much more than in the conventional FSA method executed in scalar fashion.

According to Embodiments 1 to 3 of the present invention, the search of character strings for a plurality of key words is comprised of two stages. In a first stage, a text is reduced into key words and character strings analogous thereto, followed by a second stage in which each character string thus reduced is checked for any key word. As explained above with reference to FIG. 10, the first stage permits high-speed pipeline processing, and the second stage reduces the amount of characters to be processed, thereby leading to a higher speed of the whole operation. Now, assume that the processing speed of the conventional search of a character string is unity, the processing speed at the first stage is $\alpha$, the reduction rate (that is, "Amount of candidate character strings÷Amount of text") at the first stage is $\beta$, and that the same method as the conventional character string search is applied to the second stage. Then, the processing time at the first stage is given as $N/\alpha$ where $N$ is the amount of the text, and the processing time at the second stage as $N\beta$ since the amount of candidates is $N\beta$ and the speed 1.

As a result, the ratio of processing time between the method of Embodiments 1 and 2 and the conventional method is given as $$(N/\alpha + N\beta): N = (1/\alpha + 62): 1$$

If $\alpha=10$ and $\beta=0.1$, for instance, the method according to Embodiment 2 of the present invention is five times higher in speed than the conventional method.

Actual values of $\alpha$ and $\beta$ will be explained a little more in detail. To begin with, reference is had to Embodiment 1 which has realized the present invention by an exclusive hardware.

First, consider $\alpha$. The processings of one text character at the first stage of Embodiment 1 include the steps of reading a text character, generating a RAM address by hashing, reading the appearance mode information from the RAM and updating a counter. As shown in FIG. 10, the processing, which is pipelined, is completed apparently in a unit time (machine cycle) for one text character. According to the program based on the FSA method shown in FIG. 12, by contrast, the processing of a text character is taken through the loop of steps 1204 to 1212, requiring at least 10 machine cycles. Thus $\alpha>10$.

Figure 19:
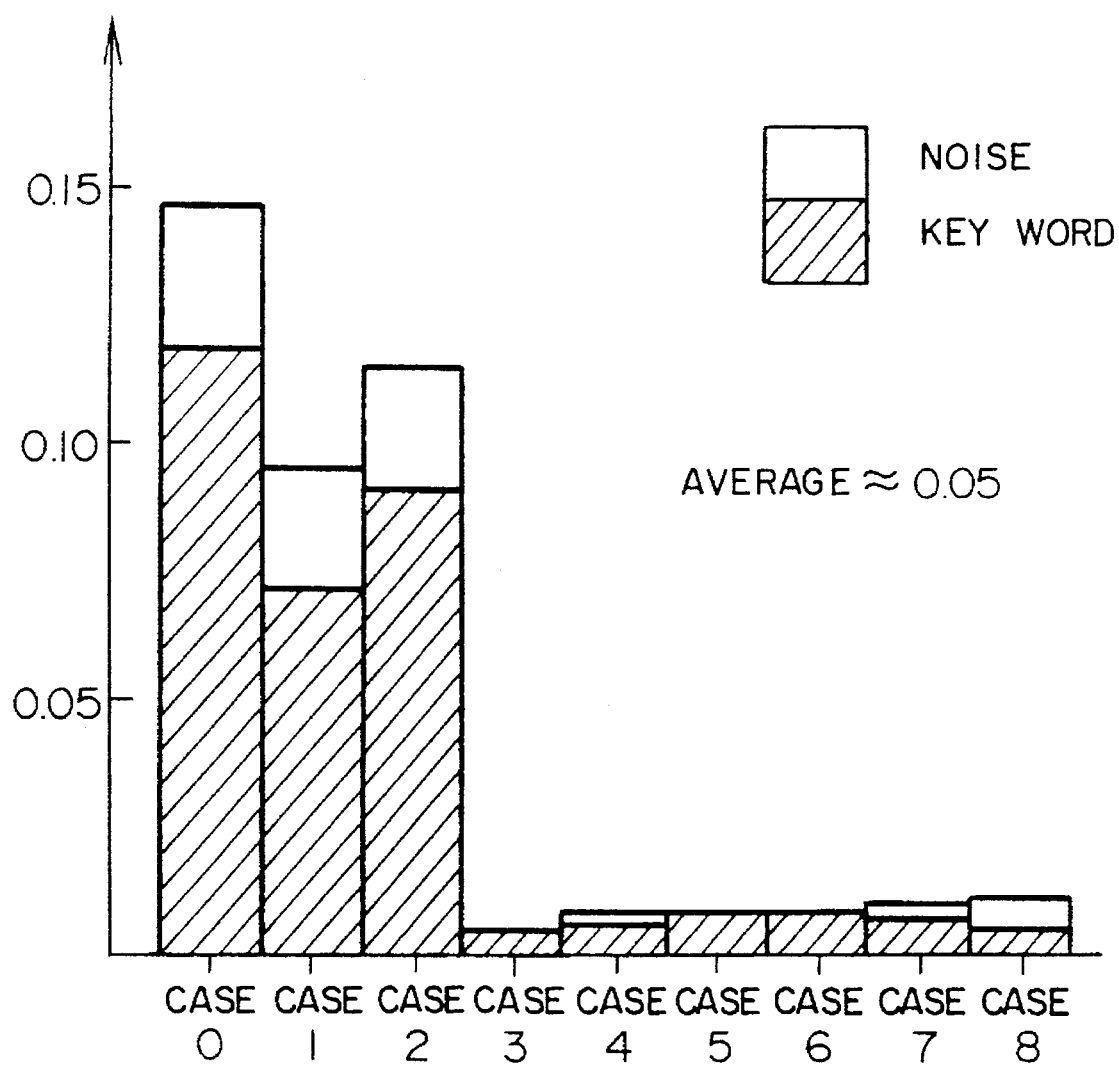
FIG. 19 is a diagram showing the result of actual measurement of the reduction rate of the primary reduction processing.

Now, $\beta$ will be explained. As described above, $\beta$ is a ratio indicating the extent to which a text is reduced at the first stage. This ratio depends to a large measure on the text and the key word. The result of actual measurements of $\beta$ for various combinations of text and key word is shown in FIG. 19. In FIG. 19, a given combination of text and key word is considered as one case, and $\beta$ is actually measured for nine cases with reduced candidates further separated into noise and character strings having a coincident key word. Cases 0 to 2 represent a text and a key word in the same field, that is, a situation where a technical term of computer is given as a key word with a computer-related reference as a text, for example. Cases 3 to 8, on the other hand, represent a text-key word combination between different fields. As obvious from FIG. 19, $\beta$ is about 0.1 to 0.15 in the same field, and about 0 to 0.01 between different fields, or an average of about 0.05 in the example under consideration.

As a result, the method and system for character string search according to the present embodiment is about 6.7 times higher in speed than the FSA method in the case of FIG. 19.

Figures 20, 21:
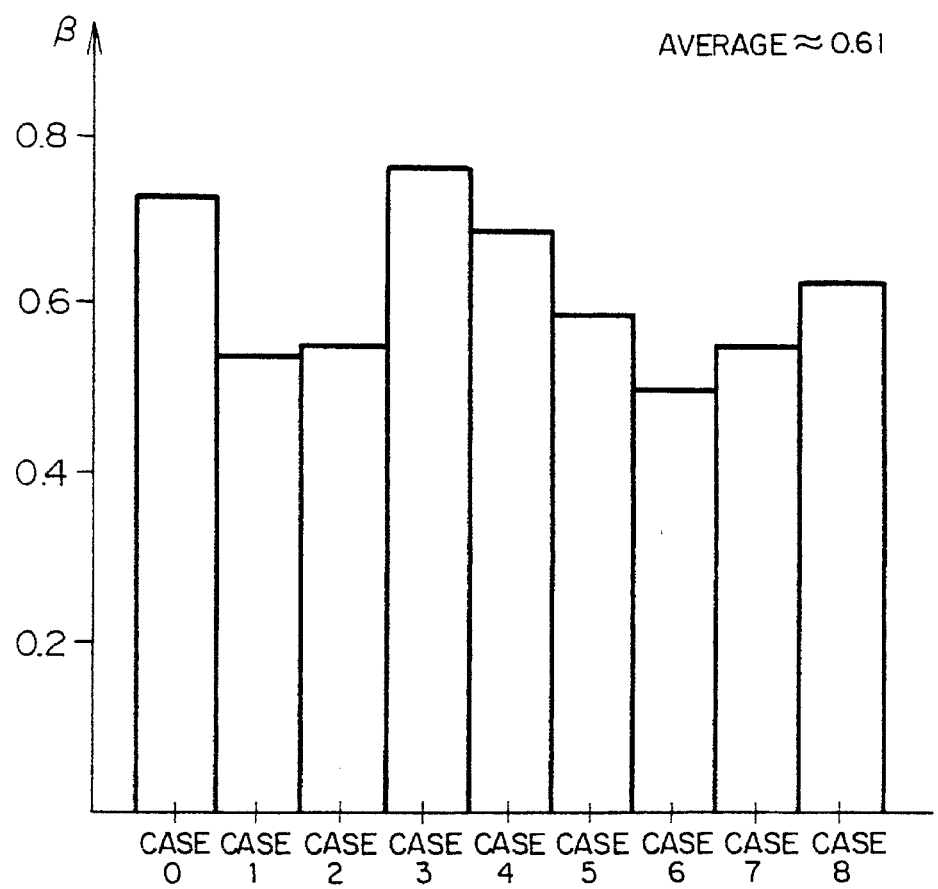
FIG. 20 is a diagram showing the result of actual measurement in a second embodiment of the character search method according to the present invention.
FIG. 21 is a diagram showing the result of actual measurement of the reduction rate by the primary reduction processing of FIG. 13.

Now, the effect of Embodiment 2 realizing the present invention by use of a normal vector computer will be explained. In this case, the routine for primary reduction processing is realized by following the flowchart of FIG. 13, and that for secondary reduction processing by following the flowchart of FIG. 15. In processing a vectorialized program, however, the ability to execute in parallel those vector instruction strings which can be overlapped (called "chaining") usually varies from one type of vector computer to another. As a result, such an ability cannot be definitely determined for the above-mentioned parameter $\alpha$. The effect of Embodiment 2 will be described below on the basis of the result of implementation of the performance obtained when the algorithm of Embodiment 2 described in the program language FORTRAN is executed on the S810 Array Processor System of Hitachi Ltd., and that obtained when the conventional FSA method is executed by a scalar processing unit of the S810 Array Processor System. FIG. 20 shows values obtained by actually measuring the performances of the above-mentioned two methods by giving two key words to a text of 16386 characters. As explained above, in the text search method according to the present invention, the value of the parameter $\beta$ greatly affects the performance. By giving two types of key words, therefore, the performance is actually measured for the values $\beta$ of 0.015 and 0.8. Calculations in the opposite way from these values show that the performance ratio of the vectorialized routine of primary search processing to the scalar FSA method is 13.2, and the performance ratio of the vectorialized FSA method to the scalar FSA method is 6.56. Therefore, the ratio of the processing time between the text search method according to Embodiment 2 and the scalar FSA method is given as $$(N/13.2 + \beta N/6.56): N = (1/13.2 + \beta/6.56): 1$$

(where N is the text amount).

The result of actual measurement of the reduction rate $\beta$ intended for a thesis in the English language is shown in FIG. 21. In FIG. 19, Cases 0 to 2 refer to a combination of text and key word in the same field, and Cases 3 to 8 a combination between different fields. Unlike in FIG. 19, however, there is no definite correlationship between the information on whether a text coincides with a key word or not and the reduction rate $\beta$. This is due to the fact that noise accounts for a great proportion since a key word is registered with the appearance information vector in units of one byte. In the example under consideration, the average value of $\beta$ is about 0.61.

As a result, the performance of the present algorithm on the vector computer is about 9.5 times higher in speed than that of the FSA method in the example shown in FIG. 21.

A modification of Embodiment 2 of the present invention is expected to produce an effect greater than Embodiment 2 itself. Also, Embodiment 4 is expected to attain an effect approximate to that of Embodiment 2.

We claim:

1. A vector processor for searching a text character string for a candidate character string likely to coincide with one of a plurality of key word character strings, comprising:

first generating means for generating, from the text character string, a text vector including elements representing each of the characters in the text character string;

second generating means for generating, from the key word character strings and the text vector, an appearance mode vector including elements representing an appearance mode for each different character in the text character string, the appearance mode for each character indicating at least if the character appears in at least one of the key word character strings;

storing means for storing the text vector and the appearance mode vector;

first reading means for sequentially reading the elements of the text vector from the storing means;

second reading means for reading, from the storing means, the elements of the appearance mode vector corresponding to the elements of the text vector sequentially read from the storing means by the first reading means; and detecting means for detecting a candidate character string constituted by a sequence of characters in the text character string each appearing in at least one of the key word character strings based on the elements of the text vector sequentially read from the storing means by the first reading means and the elements of the appearance mode vector read from the storing means by the second reading means, the sequence of characters being a continuous series of characters in the text character string.

2. A vector processor according to claim 1, wherein at least one element of the appearance mode vector represents an appearance mode for a plurality of different characters in the text character string, and the second reading means includes accessing means for accessing the at least one element of the appearance mode vector representing an appearance mode for a plurality of different characters in the text character string in response to any of the plurality of different characters.

3. A vector processor according to claim 2, wherein the accessing means includes means for hashing a character code for a character represented by an element read from the text vector into a hashed code having a smaller number of bits than the character code, the hashed code being the same for the plurality of different characters, and means for reading, from the storing means, the at least one element of the appearance mode vector representing an appearance mode for a plurality of different characters in the text character string using the hashed code to access the at least one element of the appearance mode vector representing an appearance mode for a plurality of different characters in the text character string.

4. A vector processor according to claim 1, wherein the storing means includes a first memory for storing the text vector and a second memory for storing the appearance mode vector.

5. A vector processor according to claim 1, wherein the detecting means includes means for detecting a position in the text character string of a leading character of a candidate character string and a length of the candidate character string, the candidate character string being constituted by a sequence of characters in the text character string each appearing in at least one of the key word character strings, based on the elements of the text vector sequentially read from the storing means by the first reading means and the elements of the appearance mode vector read from the storing means by the second reading means.

6. A method of searching a plurality of candidate character strings for a character string coinciding with a key word character string, the candidate character strings being likely to coincide with the key word character string and having been detected from a text character string, the key word character string being constituted by a sequence of characters, the method being performed by a computer and comprising the steps of:

(a) storing state transition destination information including a state transition destination for each of a plurality of characters which may appear in the text character string for each of a plurality of states determined by the sequence of the characters of the key word character string, the states including a final state indicating that an end of the sequence of the characters of the key word character string has been reached;

(b) determining, based on the state transition destination information stored in the step (a), if the state transition destination for a leading character of each candidate character string is the final state indicating that the end of the sequence of the characters of the key word character string has been reached;

(c) determining, based on the state transition destination information stored in the step (a), if the state transition destination for a second character of each candidate character string is the final state indicating that the end of the sequence of the characters of the key word character string has been reached;

(d) repeating the step (c) for each remaining character of each candidate character string; and (e) if it is determined in any of the steps (b), (c), and (d) that the state transition destination for one character of one of the candidate character strings is the final state indicating that the end of the sequence of the characters of the key word character string has been reached, detecting a character string constituted by the characters of the one candidate character string from the leading character of the one candidate character string up to and including the one character of the one candidate character string as the character string coinciding with the key word character string.

7. A method according to claim 6, wherein the steps (b), (c), and (d) are performed in an overlapping manner by the computer.

8. A method according to claim 6, wherein the step (a) includes the substep of storing, as state transition destination information, a state transition destination vector including elements representing a state transition destination for each of a plurality of characters which may appear in the text character string for each of a plurality of states determined by the sequence of the characters of the key word character string, the states including a final state indicating that an end of the sequence of the characters of the key word character string has been reached, the step (b) includes the substeps of (b1) sequentially reading elements of the state transition destination vector corresponding to a leading character of each candidate character string, and (b2) determining if the elements read in the substep (b1) represent the final state indicating that the end of the sequence of the characters of the key word character string has been reached, and the step (c) includes the substeps of
- (c1) sequentially reading elements of the state transition destination vector corresponding to a second character of each candidate character string, and
- (c2) determining if the elements read in the substep (c1) represent the final state indicating that the end of the sequence of the characters of the key word character string has been reached.

9. A method according to claim 8, wherein the substep (b1) includes the substeps of
- (b11) generating an input character vector including elements representing a leading character of each candidate character string,
- (b12) sequentially reading the elements of the input character vector generated in the substep (b11), and
- (b13) sequentially reading elements of the state transition destination vector corresponding to the elements of the input character vector sequentially read in the substep (b12), and the substep (c1) includes the substeps of
- (c11) generating an input character vector including elements representing a second character of each candidate character string,
- (c12) sequentially reading the elements of the input character vector generated in the substep (c11), and
- (c13) sequentially reading elements of the state transition destination vector corresponding to the elements of the input character vector sequentially read in the substep (c12).

10. A method according to claim 6, wherein the step (a) includes the substeps of
- (a1) storing, as state transition destination information, a state transition destination vector including elements representing a state transition destination for each of a plurality of characters which may appear in the text character string for each of a plurality of states determined by the sequence of the characters of the key word character string, the states including a final state indicating that an end of the sequence of the characters of the key word character string has been reached, and
- (a2) generating an acceptance vector including elements corresponding to the plurality of states determined by the sequence of the characters of the key word character string and indicating whether each of the states is the final state indicating that the end of the sequence of the characters of the key word character string has been reached, the step (b) includes the substeps of
- (b1) reading elements of the state transition destination vector corresponding to a leading character of each candidate character string,
- (b2) reading elements of the acceptance vector corresponding to the elements of the state transition destination vector read in the substep (b1), and
- (b3) determining if any of the elements of the acceptance vector read in the substep (b2) indicate that the corresponding state is the final state indicating that the end of the sequence of the characters of the key word character string has been reached, and the step (c) includes the substeps of
- (c1) reading elements of the state transition destination vector corresponding to a second character of each candidate character string,
- (c2) reading elements of the acceptance vector corresponding to the elements of the state transition destination vector read in the substep (c1), and
- (c3) determining if any of the elements of the acceptance vector read in the substep (c2) indicate that the corresponding state is the final state indicating that the end of the sequence of the characters of the key word character string has been reached.

11. A method according to claim 10, wherein each element of the acceptance vector which indicates that the corresponding state is the final state indicating that the end of the sequence of the characters of the key word character string has been reached represents a length of the key word character string.

12. A method according to claim 6, wherein the candidate character strings are detected from the text character string by detecting a plurality of sequences of characters from the text character string, wherein each of the characters in each of the sequences appears in the key word character string such that the sequences of characters constitute candidate character strings likely to coincide with the key word character string.

13. A method according to claim 6, wherein the candidate character strings are detected from the text character string by dividing the text character string into a plurality of character strings separated from each other by characters which do not appear in the key word character string, wherein each of the characters in each of the character strings appears in the key word character string such that the character strings constitute candidate character strings likely to coincide with the key word character string.

14. A method of searching a text character string for a candidate character string likely to coincide with one of a plurality of key word character strings, the method being performed by a computer and comprising the steps of:
- (a) generating, from the text character string, a text vector including elements representing each of the characters in the text character string, the computer storing the elements of the text vector after the text vector has been generated;
- (b) generating, from the key word character strings and the text vector, an appearance mode vector including elements representing an appearance mode for each different character in the text character string, the appearance mode vector for each character indicating at least if the character appears in at least one of the key word character strings, the computer storing the elements of the appearance mode vector after the appearance mode vector has been generated;
- (c) sequentially reading the elements of the text vector;
- (d) reading the elements of the appearance mode vector corresponding to the elements of the text vector sequentially read in the step (c); and
- (e) detecting a candidate character string constituted by a sequence of characters in the text character string each appearing in at least one of the key word character strings based on the elements of the text vector sequentially read in the step (c) and the elements of the appearance mode vector read in the step (d), the sequence of characters being a continuous series of characters in the text character string.

15. A method according to claim 14, wherein the steps (c), (d), and (e) are performed in an overlapping manner by the computer.

16. A method according to claim 14, wherein the step (e) includes the substeps of (e1) determining if each character in the text character string is to be a leading character of a candidate character string, (e2) determining if each character in the text character string is to be an intermediate character in a candidate character string including a character in the text character string immediately preceding the character, and (e3) determining if a character in the text character string immediately preceding each character in the text character string is to be a final character in a candidate character string including the preceding character, wherein the substeps (e1), (e2), and (e3) are performed for each character in the text character string based on an element read from the text vector in the step (c) representing the character and elements read from the appearance mode vector in the step (d) representing the appearance mode for the character and the appearance mode for a character in the text character string immediately preceding the character.

17. A method according to claim 16, wherein the substep (e1) includes the substep of determining that a character in the text character string is to be a leading character of a candidate character string when the appearance mode for the character indicates that the character appears in at least one of the key word character strings and the appearance mode for the preceding character indicates that the preceding character does not appear in at least one of the key word character strings, the substep (e2) includes the substep of determining that a character in the text character string is to be an intermediate character in a candidate character string including a character in the text character string immediately preceding the character when the appearance mode for the character and the appearance mode for the preceding character indicate that the character and the preceding character both appear in at least one of the key word character strings, and the substep (e3) includes the substep of determining that a character in the text character string immediately preceding each character in the text character string is to be a final character in a candidate character string including the preceding character when the appearance mode for the character indicates that the character does not appear in at least one of the key word character strings and the appearance mode for the preceding character indicates that the preceding character does appear in at least one of the key word character strings.

18. A method according to claim 14, wherein the appearance mode includes position information relating to a position of the character in the at least one of the key word character strings.

19. A method according to claim 18, wherein the position information includes information indicating if the character is a leading character, an intermediate character, or a last character in the at least one of the key word character strings.

20. A method according to claim 18, wherein the position information includes information indicating whether a length of the at least one of the key word character strings from a beginning of the at least one of the key word character strings up to and including the position of the character in the at least one of the key word character strings is less than or equal to a length of a shortest one of the key word character strings.

21. A method according to claim 18, wherein the position information includes information indicating a position of the character in the at least one of the key word character strings, and the step (b) includes the substep of determining that a character in the text character string is not to be included in the candidate character string when the appearance mode indicates that the character appears in the at least one of the key word character strings but the position information indicates that the position of the character in the at least one of the key word character strings would conflict with a position of the character in the candidate character string if the character were to be included in the candidate character string.

22. A method according to claim 18, wherein the position information includes information indicating a position of the character in the at least one of the key word character strings, and the step (b) includes the substep of determining that a character in the text character string is not to be included in a current candidate character string including a character in the text character string immediately preceding the character in the text character string but is to be included in a new candidate character string when the appearance mode for the character indicates that the character appears in the at least one of the key word character strings and the appearance mode for the preceding character indicates that the preceding character appears in the at least one of the key word character strings but the position information indicates that the position of the character in the at least one of the key word character strings would conflict with a position of the character in the current candidate character string if the character were to be included in the current candidate character string.

23. A method according to claim 14, wherein the step (e) includes the substeps of (e1) sequentially comparing each element of the appearance mode vector read in the step (d) with an element of the appearance mode vector read in the step (d) immediately before the element of the appearance mode vector was read in the step (d), and (e2) detecting positions in the text character string of a leading character and a final character of a candidate character string based on results of the comparing performed in the substep (e1).

24. A method according to claim 23, wherein the substep (e1) includes the substeps of (e11) generating a detection state vector including all of the elements of the appearance mode vector read in the step (d), (e12) sequentially comparing each element of the detection state vector with an element of the detection state vector immediately preceding the element in the detection state vector, and (e13) generating a delimiting position vector including elements indicating results of the comparing performed in the substep (e12).

25. A method of searching a text character string for a candidate character string likely to coincide with a key word character string, the method being performed by a computer and comprising the steps of:

(a) determining, for each character in the text character string, an appearance mode indicating at least if the character appears in the key word character string; and (b) detecting, from the text character string, a candidate character string constituted by a sequence of characters each appearing in the key word character string based on the appearance mode for each character in the text character string, the sequence of characters being a continuous series of characters in the text character string.

26. A method according to claim 25, wherein the key word character string is one of a plurality of key word character strings, the step (a) includes the substep of determining, for each character in the text character string, an appearance mode indicating at least if the character appears in at least one of the key word character strings without indicating which of the key word character strings the character appears in, and the step (b) includes the substep of detecting a sequence of characters from the text character string based on the appearance mode for each character in the text character string, wherein each of the characters in the sequence of characters appears in at least one of the key word character strings such that the sequence of characters constitutes a candidate character string likely to coincide with any of the key word character strings.

27. A method according to claim 26, wherein the step (a) includes the substeps of (a1) storing, for each of a plurality of characters which may appear in the text character string, an appearance mode indicating at least if the character appears in at least one of the key word character strings without indicating which of the key word character strings the character appears in, and (a2) reading out the stored appearance mode for each character which actually appears in the text character string, thereby determining, for each character in the text character string, an appearance mode indicating at least if the character appears in at least one of the key word character strings without indicating which of the key word character strings the character appears in.

28. A method according to claim 27, wherein the substep (a1) includes the substeps of:

(a11) storing, for each of a plurality of characters which may appear in the text character string, an appearance mode indicating that the character does not appear in any of the key word character strings, and (a12) changing, for each character which appears in at least one of the key word character strings, the stored appearance mode indicating that the character does not appear in any of the key word character strings to an appearance mode indicating at least that the character appears in at least one of the key word character strings without indicating which of the key word character strings the character appears in.

29. A method according to claim 25, wherein the step (b) includes the substeps of (b1) determining if each character in the text character string is to be a leading character of a candidate character string, (b2) determining if each character in the text character string is to be an intermediate character in a candidate character string including a character in the text character string immediately preceding the character, and (b3) determining if a character in the text character string immediately preceding each character in the text character string is to be a final character in a candidate character string including the preceding character, wherein the substeps (b1), (b2), and (b3) are performed based on the appearance mode for each character in the text character string and the appearance mode for a character in the text character string immediately preceding the character.

30. A method according to claim 29, wherein the substep (b1) includes the substep of determining that a character in the text character string is to be a leading character of a candidate character string when the appearance mode for the character indicates that the character appears in the key word character string and the appearance mode for the preceding character indicates that the preceding character does not appear in the key word character string, the substep (b2) includes the substep of determining that a character in the text character string is to be an intermediate character in a candidate character string including a character in the text character string immediately preceding the character when the appearance mode for the character and the appearance mode for the preceding character indicate that the character and the preceding character both appear in the key word character string, and the substep (b3) includes the substep of determining that a character in the text character string immediately preceding each character in the text character string is to be a final character in a candidate character string including the preceding character when the appearance mode for the character indicates that the character does not appear in the key word character string and the appearance mode for the preceding character indicates that the preceding character does appear in the key word character string.

31. A method according to claim 25, wherein the appearance mode includes position information relating to a position of the character in the key word character string.

32. A method according to claim 31, wherein the position information includes information indicating if the character is a leading character, an intermediate character, or a last character in the key word character string.

33. A method according to claim 31, wherein the key word character string is one of a plurality of key word character strings, and the position information includes information indicating whether a length of the key word character string from a beginning of the key word character string up to and including the position of the character in the key word character string is less than or equal to a length of a shortest one of the key word character strings.

34. A method according to claim 31, wherein the position information includes information indicating a position of the character in the key word character string, and the step (b) includes the substep of determining that a character in the text character string is not to be included in the candidate character string when the appearance mode indicates that the character appears in the key word character string but the position information indicates that the position of the character in the key word character string would conflict with a position of the character in the candidate character string if the character were to be included in the candidate character string.

35. A method according to claim 31, wherein the position information includes information indicating a position of the character in the key word character string, and the step (b) includes the substep of determining that a character in the text character string is not to be included in a current candidate character string including a character in the text character string immediately preceding the character in the text character string but is to be included in a new candidate character string when the appearance mode for the character and the appearance mode for the preceding character indicate that the character and the preceding character both appear in the key word character string but the position information indicates that the position of the character in the key word character string would conflict with a position of the character in the current candidate character string if the character were to be included in the current candidate character string.

36. A method according to claim 25, wherein the step (a) includes the substeps of (a1) dividing the text character string into a plurality of sets of characters, each set of characters constituting a composite character, and (a2) determining, for each of the composite characters, an appearance mode indicating at least if the composite character appears in the key word character string, and the step (b) includes the substep of detecting, from the text character string, a candidate character string constituted by a sequence of composite characters each appearing in the key word character string based on the appearance mode for each composite character in the text character string.

37. A method of searching a text character string for a character string coinciding with a key word character string, the method being performed by a computer and comprising the steps of:

(a) detecting, from the next character string, a plurality of candidate character strings likely to coincide with the key word character string; and (b) determining if the candidate character strings include a candidate character string coinciding with the key word character string;

wherein the step (a) includes the substep of detecting a plurality of sequences of characters from the text character string, each of the sequences of characters being a continuous series of characters in the text character string, wherein each of the characters in each of the sequences of characters appears in the key word character string such that the sequences of characters constitute respective candidate character strings likely to coincide with the key word character string.

38. A method of searching a text character string for a character string coinciding with a key word character string, the method being performed by a computer and comprising the steps of:

(a) detecting, from the text character string, a plurality of candidate character strings likely to coincide with the key word character string; and (b) determining if the candidate character strings include a candidate character string coinciding with the key word character string;

wherein the key word character string is one of a plurality of key word character strings, the step (a) includes the substep of detecting a sequence of characters from the text character string, the sequence of characters being a continuous series of characters in the text character string, wherein each of the characters in the sequence of characters appears in at least one of the key word character strings such that the sequence of characters constitutes a candidate character string likely to coincide with any of the key word character strings, and the step (b) includes the substep of determining if the sequence of characters coincides with any of the key word character strings:

39. A method of searching a text character string for a character string coinciding with a key word character string, the method being performed by a computer and comprising the steps of:

(a) detecting, from the text character string, a plurality of candidate character strings likely to coincide with the key word character string; and (b) determining of the candidate character strings include a candidate character string coinciding with the key word character string;

wherein the key word character string is one of a plurality of key word character strings, the step (a) includes the substeps of (a1) detecting a plurality of candidate character strings likely to coincide with any of the key word character strings from (1) a text vector including elements representing each of the characters in the text character string and (2) a plurality of key word vectors each including elements representing each of the characters in a respective one of the key word character strings, and (a2) generating a primary result vector including elements each representing a respective one of the candidate character strings, and the step (b) includes the substep of determining, based on the primary result vector, if each of the candidate character strings coincides with any of the key word character strings.

* * * * *